US006944146B1

(12) United States Patent
Barany et al.

(10) Patent No.: US 6,944,146 B1
(45) Date of Patent: Sep. 13, 2005

(54) COMMUNICATIONS OF SIGNALING IN A MOBILE COMMUNICATIONS SYSTEM WITH REDUCED INTERFERENCE

(75) Inventors: Peter A. Barany, McKinney, TX (US); Shavantha Kularatna, Irving, TX (US); Eric N. Johnson, Nepean (CA); Shamim Akbar Rahman, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/366,849

(22) Filed: Aug. 4, 1999

Related U.S. Application Data

(60) Provisional application No. 60/122,459, filed on Mar. 1, 1999.

(51) Int. Cl.[7] .............................................. H04Q 7/24
(52) U.S. Cl. ....................................... 370/338; 370/329
(58) Field of Search ............................... 370/328, 329, 370/336, 337, 338, 352, 353, 354, 355, 356, 370/472, 469, 321, 322, 431, 436, 437, 443, 370/330, 389; 455/446, 447, 449; 375/346, 375/354, 362, 365

(56) References Cited

U.S. PATENT DOCUMENTS

| | | | |
|---|---|---|---|
| 4,866,710 A | 9/1989 | Schaeffer ..................... 370/321 |
| 5,093,928 A * | 3/1992 | Kage ........................... 455/516 |
| 5,396,539 A | 3/1995 | Slekys et al. | |
| 5,570,352 A | 10/1996 | Poyhonen ................... 370/330 |
| 5,805,633 A * | 9/1998 | Uddenfeldt ................. 375/133 |
| 5,818,829 A * | 10/1998 | Raith et al. .................. 370/347 |
| 5,901,144 A | 5/1999 | Maki et al. .................. 370/330 |
| 5,946,624 A | 8/1999 | Petranovich et al. ........ 455/447 |
| 5,974,323 A * | 10/1999 | Doner .......................... 455/447 |
| 5,999,818 A | 12/1999 | Gilbert et al. ............... 455/447 |

6,011,786 A * 1/2000 Dent ........................... 370/330

(Continued)

FOREIGN PATENT DOCUMENTS

WO WO 95/12936 5/1995

OTHER PUBLICATIONS

Nortel Networks, (Peter A. Barany, Eric N. Johnson, Shavantha Kularatna), *UWC-136 Edge Control Channel Options*, UWCC.GTF.PDFG/99.02.09, pp. 1-17 (Feb. 9, 1999).

(Continued)

Primary Examiner—Duc Ho
Assistant Examiner—Thien D Tran
(74) Attorney, Agent, or Firm—Trop, Pruner & Hu, P.C.

(57) ABSTRACT

A method and apparatus for use in a mobile communications system having a plurality of cell segments includes allocating a plurality of channels to perform communications and defining a plurality of time groups. A channel reuse pattern is provided that is based on the plurality of channel frequencies and the plurality of time groups. Control channels are carried in a different time slot of a frame in each time group. Predetermined time slots are allocated as guard periods to reduce likelihood of interference of signaling due to overlap of time slots in neighboring cell segments. In one arrangement, three channel frequencies are allocated. Further, three or four time groups are defined to provide an effective 3/9 or 4/12 channel reuse pattern. In each time group, control channels are carried in odd time slots of a time-division multiple access (TDMA) frame. The even time slots are employed as guard periods to reduce likelihood of interference caused by overlapping time slots, which may occur in relatively large cells because of propagation delays in communications between mobile units and base stations.

12 Claims, 17 Drawing Sheets

U.S. PATENT DOCUMENTS

| | | | | |
|---|---|---|---|---|
| 6,038,455 | A | 3/2000 | Gardner et al. | 455/447 |
| 6,069,885 | A | 5/2000 | Fong et al. | 370/336 |
| 6,272,117 | B1 * | 8/2001 | Choi et al. | 370/330 |
| 6,430,417 | B1 * | 8/2002 | Raith et al. | 455/466 |
| 6,438,115 | B1 * | 8/2002 | Mazur et al. | 370/330 |
| 6,493,539 | B1 * | 12/2002 | Falco et al. | 455/67.11 |
| 6,497,599 | B1 | 12/2002 | Johnson et al. | 445/447 |

OTHER PUBLICATIONS

Nortel Networks, (Peter A. Barany, Eric N. Johnson, Shavantha Kularatna), *Mechanisms for Implementing UWC-136 Edge Control Channels on a 200 KHZ RF Carrier*, UWC-C.GTF.PDFG/99.03.09R1, pp. 1-27 (Mar. 9, 1999).

Marc Grant, *PDFG-RF Group Meeting Summary*, UWCC.GTF.PDFG/99.04.13, pp. 1-16 (Apr. 13, 1999).

Nortel Networks, (Peter A. Barany, Eric N. Johnson, Shavantha Kularatna and Shamim Akbar Rahman), *Impact on Maximum Cell Size of Robustness of the GSM SCH Burst Deployed in "Effective" 3/9 and 4/12 Frequency Reuse Patterns with Synchronized UWC-136 Edge 200 KHZ Base Stations*, UWCC.GTC.PDFG/99.04.13.26R2, pp. 1-14 (Apr. 13, 1999).

Nortel Networks, (Peter A. Barany, Eric N. Johnson, Shavantha Kularatna and Shamim Akbar Rahman), *Proposed New Optical Information Element for 30 KHZ DCCH Structure Message and Algorithm for Rapid Acquisition of Edge Compact PFCCH and PSCH*, UWCC.GTF.PDFG/99.05.05, pp. 1-4 (May 5, 1999).

Nortel Networks, (Peter A. Barany, Eric N. Johnson), *Concept Proposal for GPRS-136HS Edge*, ETSI STC SMG2, Revision 1.0, TDoc SMG2 530/99, Agenda Item 4.3, 6.2, 7.2.6.6, pp. 1-22 (May 31-Jun. 4, 1999).

Peter Rysavy, *Paper: General Packet Radio Service (GPRS)*, Rysavy Research, for PCS Data Today Online Journal, pp. 1-5 (Sep. 30, 1998).

Paul Meche, *UWC-136 RTT Update*, Conference Call, TR45.3/98.04.06.07R4 (TR45/98.03.19R6), Universal Wireless Communications Consortium, pp. 1-5, 177-180, 198, 212-214, and 242-250 (Feb. 26, 1999).

Paul Meche, *Evolution of TDMA to 3G*, Universal Wireless Communications Consortium, pp. 1-19, dated at least as early as Jun. 7, 1999.

*UWC-136: TDMA'S Migration to Third Generation*, Universal Wireless Communications Consortium, pp. 1-2, printed from web site http://uwcc.org/cliaw98/backg.htm, dated as early as Jun. 6, 1999.

*Universal Wireless Communications Consortium (UWCC) Announces UWC-136, The TDMA IS-136 Solution for Third Generation*, p. 1 (Feb. 23, 1998).

*UWC-136: TDMA'S Evolutionary Path to Third Generation*, Question & Answers, pp. 1-2, dated at least as early as Jun. 6, 1999.

John Scourias, *Overview of the Global System for Mobile Communications*, pp. 1-15, printed from web site http://www.gsmdata.com/overview.htm (Oct. 14, 1997).

*TR 45 TIA/EIA-136-121-A Draft Text*, pp. 1-26, Digital Control Channel Layer 1, (Nov. 20, 1998).

*TR 45 TIA/EIA-136-123-A Draft Text*, pp. i-xii, 1, 45, Digital Control Channel Layer 3, (Nov. 20, 1998).

* cited by examiner

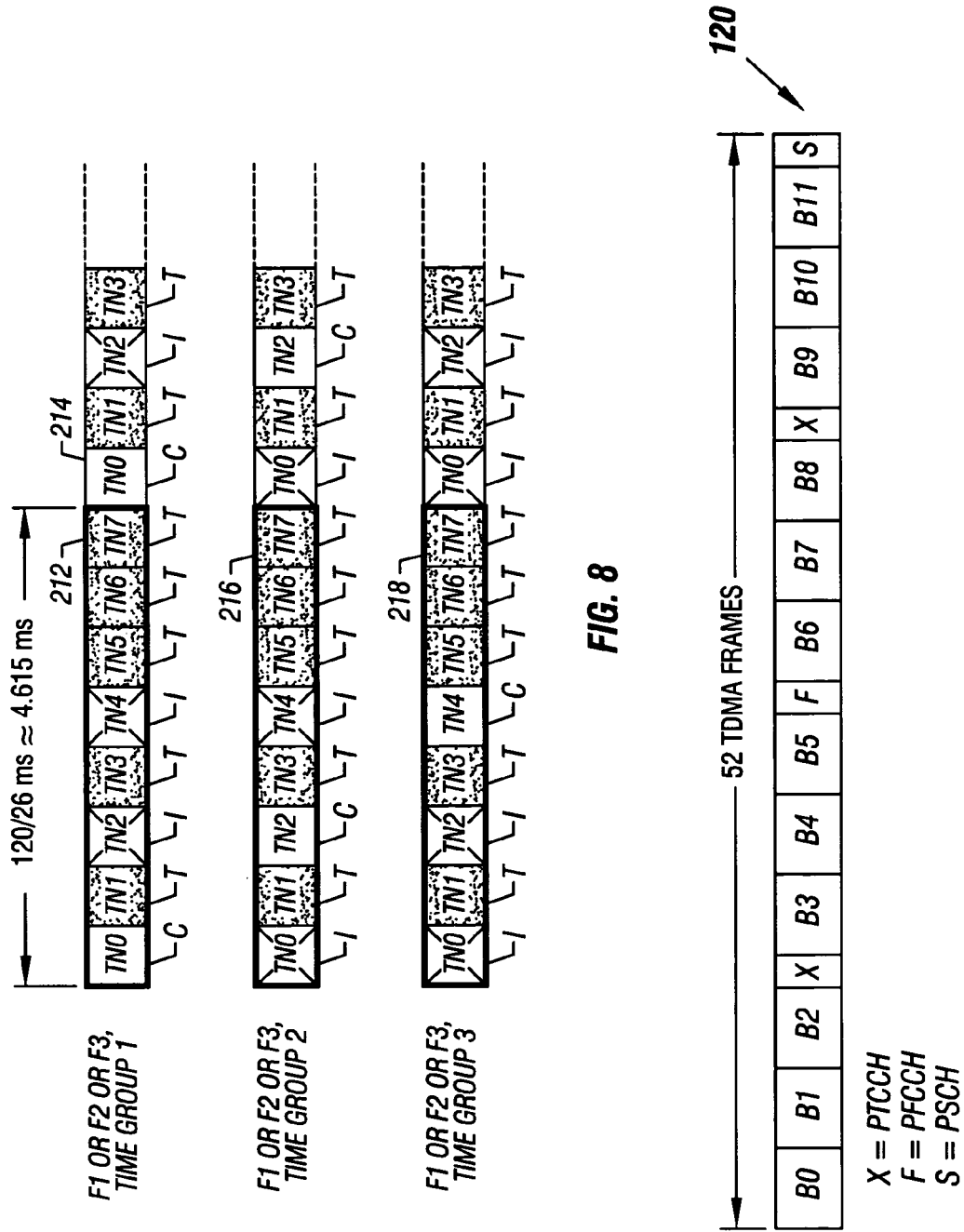

COMMUNICATIONS OF SIGNALING IN A MOBILE COMMUNICATIONS SYSTEM WITH REDUCED INTERFERENCE

The present application claims priority under 35 U.S.C. § 119(e) to U.S. Provisional Patent Application Ser. No. 60/122,459, entitled "Mechanism for Implementing 136HS Control Channels on a 200 kHz RF Carrier Using a 1/3 Frequency Re-Use Pattern," filed Mar. 1, 1999.

BACKGROUND

The invention relates to communications of signaling in a mobile communications systems with reduced interference.

Mobile communications systems, such as cellular or personal communications services (PCS) systems, are made up of a plurality of cells. Each cell provides a radio communications center in which a mobile unit establishes a call with another mobile unit or a wireline unit connected to a public switched telephone network (PSTN). Each cell includes a radio base station, with each base station connected to a mobile switching center that controls processing of calls between or among mobile units or mobile units and PSTN units.

From the original advanced mobile phone system (AMPS) standard, additional wireless protocols have been developed and implemented. One such protocol is the time-division multiple access (TDMA) protocol, originally implemented as the IS-54 standard (EIA/TIA/IS-54) and later followed by the IS-136 standard (TIA/EIA-136) from the Telecommunications Industry Association (TIA). With IS-136 TDMA, each channel carries a frame that is divided into six time slots to support up to three mobile units per channel. If half-rate voice coders are used, then each channel may be time shared among up to six mobile units. Other TDMA-based systems include Global System for Mobile (GSM) communications systems, which use a TDMA frame divided into eight time slots (or burst periods).

Traditional speech-oriented wireless systems, such as the IS-136 and GSM TDMA systems, utilize circuit-switched connection paths in which a line is occupied for the duration of the connection between a mobile unit and the mobile switching center. Such a connection is optimum for communications that are relatively continuous, such as speech. However, data networks such as local area networks (LANs), wide area networks (WANs), and the Internet use packet-switched connections, in which communication between nodes on a communications link is by data packets. Each node occupies the communications link only for as long as the node needs to send or receive data packets. With the rapid increase in the number of cellular subscribers in conjunction with the rising popularity of communications over data networks such as intranets or the Internet, a packet-switched wireless data connection that provides access to the data networks, electronic mail, files in databases, and other types of data has become increasingly desirable.

Several packet-based wireless connection protocols have been proposed to provide more efficient connections between a mobile unit and a data network. One such protocol is the General Packet Radio Service (GPRS) protocol, which complements existing GSM systems. Another technology that builds upon GPRS that has been proposed is the Enhanced Data Rate for Global Evolution (EDGE) technology, which offers a maximum data rate of 384 kilobits per second (kbps) and complements both GSM and IS-136 TDMA systems.

Because of frequency spectrum limitations, the number of channels that may be allocated for such packet-based data services in a mobile communications system may be limited. A channel reuse plan (in which groups of channels are reused at regular distances) having a relatively few number of channels may cause interference problems because of reduced distances between cells or cell sectors. Allocating more channels for packet-based services to provide for higher channel reuse plans that offer more robust carrier-to-interference performance may not be feasible because of the possibility of displacing traffic channels in an existing circuit-switched system. A need thus exists for a mobile communications method and system that reduces the likelihood of problems associated with interference between cells or cell sectors due to allocation of a limited frequency spectrum for packet-based data services or other types of mobile communications services.

SUMMARY

In general, according to one embodiment, a method for use in a mobile communications system having a plurality of cell segments includes communicating control and traffic signaling in a frame having a plurality of time slots in each cell segment. Control signaling is transmitted in time slots adjacent time slots allocated as guard periods to reduce likelihood of interference caused by overlap of time slots in neighboring cell segments.

Some embodiments of the invention may provide one or more of the following advantages. By defining an increased guard period that includes at least one time slot, the likelihood of interference due to overlap caused by propagation delays between a first time slot in a first cell segment and a second, adjacent time slot in a second, neighboring cell segment is reduced. As a result, increased protection is provided for control signaling carried in various time slots when communicating in a mobile communications system having relatively large cells. Time synchronization of the time slots is thus made possible among the cell segments so that a channel reuse plan that is based on both channel frequencies and time can be provided.

Other features and advantages will become apparent from the following description and from the claims.

BRIEF DESCRIPTION OF THE DRAWINGS

FIGS. 6–8 illustrate time-division multiple access (TDMA) frames for carrying data traffic and control channels in accordance with some embodiments in the packet-switched data link of the mobile communications system of FIG. 1A.

FIG. 9 illustrates a 52-frame multiframe for carrying data traffic and control channels in the system of FIG. 1A.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although the following description refers to embodiments for use with a packet-switched or message-switched wireless data link that complements conventional circuit-switched wireless links, it is contemplated that further embodiments may be used for different types of wireless systems, whether packet-switched or circuit-switched.

Figure 1A:
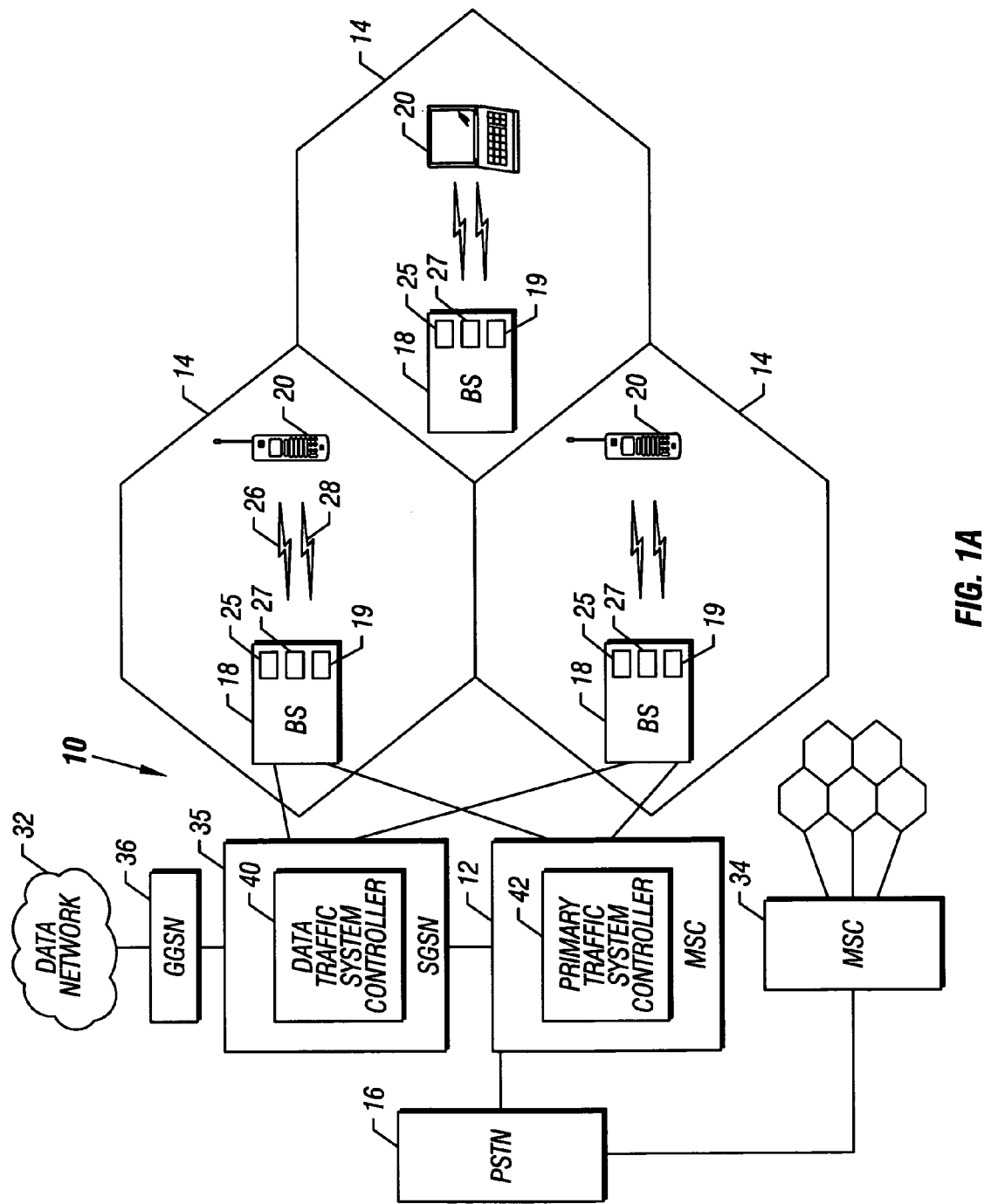
FIG. 1A illustrates an embodiment of a mobile communications system that provides both a circuit-switched traffic link and a packet-switched data link.

Referring to FIG. 1A, a mobile communications system 10, which may be a cellular or a personal communications services (PCS) system, includes a plurality of cells 14 each including a base station 18. Each base station 18 is capable of communicating with mobile units 20 (e.g., mobile telephones, mobile computers, or other types of mobile units) over radio frequency (RF) wireless links. The base stations 18 are controlled by a mobile switching center (MSC) 12 for circuit-switched communications. For packet-switched or message-switched communications, the base stations are controlled by a data traffic service node 35. In further embodiments, groups of base stations 18 may be controlled by base station controllers (not shown) that are in turn in communication with the MSC 12 and the data traffic service node 35.

In one arrangement, the base station 18 and mobile units 20 in each cell 14 are capable of communicating with two sets of carriers—a first set of carriers 26 for communicating circuit-switched traffic (e.g., speech data, short messaging services, and other circuit-switched data) and associated control signals; and a second set of carriers 28 for communicating packet-switched data traffic and associated control signals. As used here, circuit-switched traffic is referred to as primary traffic and packet-switched data traffic is referred to as packet data traffic. Packet data traffic may refer to any traffic that is sent in bursts of messages, packets, or other data structures over a link.

The packet data traffic services provided in the system 10 are complementary to the primary traffic services offered by a conventional circuit-switched system, such as a time-division multiple access (TDMA) system according to the IS-136 protocol (TIA/EIA-136 from the Telecommunications Industry Association). Alternatively, the primary traffic system may be part of a Global System for Mobile (GSM) communications system. The packet data traffic services in one embodiment may be according to the 136 high speed (136 HS) protocol as adopted by the Universal Wireless Communication Consortium (UWCC). The 136 HS protocol (also referred to as EDGE Compact) incorporates much of the Enhanced Data Rate for Global Evolution (EDGE) technology adopted by ETSI (European Telecommunications Standards Institute), but uses a reduced frequency spectrum.

Due to the use of a limited spectrum (under 1 megahertz or MHz in one embodiment), the number of channels employed for packet data services is limited (e.g., 3 channels in one embodiment). A channel reuse plan that employs a small number of channels may cause interference problems due to relatively small distances between cells or cell sectors having the same frequency. However, a higher effective channel reuse plan may be created by assigning cells or cell sectors to different combinations of frequencies and time groups. As a result, a higher effective channel reuse pattern that is based on both frequency and time can be achieved as compared to a reuse plan based only on the available frequencies, such as performed in conventional mobile systems. In the channel reuse pattern, a cluster of cell segments are defined in which each cell segment has a unique combination of assigned carrier frequency and time group. A cell segment as used here refers to a cell, cell sector, or other portion of a cell.

According to one embodiment, packet data traffic and associated control signals may be carried by frames that each includes a plurality of time slots (e.g., 8 time slots). To allow division by time for the channel reuse pattern, base stations controlling the cell segments are time synchronized so that the time slots of the frames being communicated in the cell segments are synchronized. However, as cell sizes increase and potential distances between mobile units and the base station increase, propagation delays may cause overlap of time slots in neighboring cells. This may cause unacceptable interference since traffic in a first time slot in a first cell segment may be shifted by propagation delay to overlap a second, adjacent time slot in a second, neighboring cell segment. As a result, synchronization may be lost which may cause the channel reuse pattern to revert to one that is based only on frequency and not time. To overcome this, certain time slots are assigned as guard periods so that signaling in one time slot is protected against interference by an adjacent time slot of a neighboring cell segment.

Figure 2:
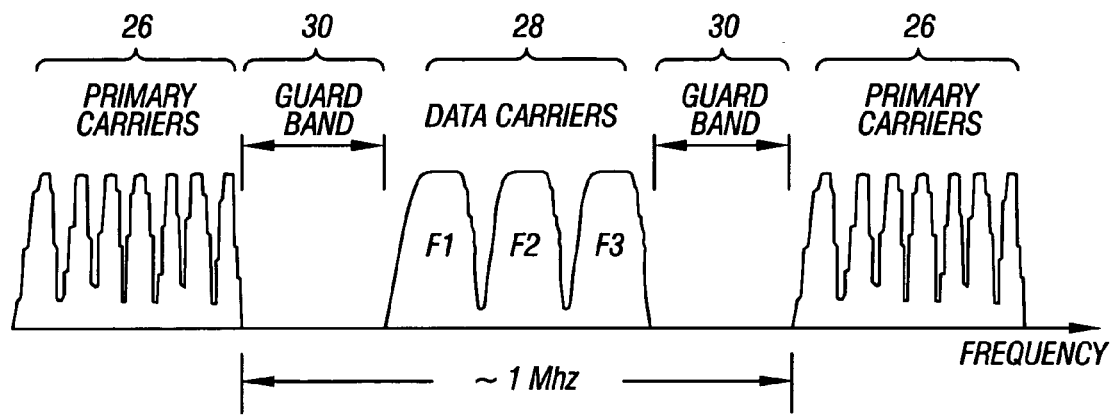
FIG. 2 illustrates carriers for use in the mobile communications system of FIG. 1A.

Referring further to FIG. 2, according to one embodiment, the base stations 18 include transceivers 25 that send and receive 30-kHz (kilohertz) carriers (26) to carry circuit-switched traffic and associated control signals, e.g., according to the IS-136 protocol. In addition, packet data traffic (e.g., packet-switched data) and associated control signals are carried by 200-kHz carriers (28) that may be provided by transceivers 27 in each base station 18 in the same cell as the 30-kHz carriers. Guard bands 30 are defined between the first set of carriers 26 and the second set of carriers 28. The second set of three 200-kHz carriers 28 and guard band 30 may be deployed in less than approximately 1 MHz of frequency spectrum.

The MSC 12 includes a primary traffic controller 42 that controls the establishment, processing, and termination of circuit-switched calls (e.g., speech, short messages, and so forth) between or among mobile units 20 in one or more cells 14 or between or among mobile units 20 in a cell 14 and a wireline device (e.g., a telephone) coupled to a public switched telephone network (PSTN) 16. More than one MSC (such as an MSC 34 associated with a different service provider) may be included in the mobile communications system 10.

The data traffic service node 35 includes a data traffic system controller 40 that controls the establishment, processing, and termination of packet-switched communications. In one embodiment, the data traffic service node 35 may be a serving GPRS support node (SGSN) according to the General Packet Radio Service (GPRS) protocol. Also in accordance with GPRS, the SGSN 35 communicates with a gateway GPRS support node (GGSN) 36, which provides an interface to a data network 32. Example data networks 32 include local area networks (LANs), wide area networks (WANs), the Internet, or other types of private or public networks. Communications across data networks may proceed according to TCP/IP (Transmission Control Protocol/Internet Protocol). More generically, the nodes 35 and 36 may include any system or systems that are capable of controlling packet-switched data communications between a mobile unit 20 and the data network 32. Further, the nodes 35 and 36 may be implemented in the same platform as the MSC 12 in an alternative embodiment.

Effectively, two wireless links are provided for mobile units 20 in the cells 14 controlled by the MSC 12: a packet data link, including the carriers 28, the base stations 18, and the data traffic system controller 40, to provide relatively high-speed (up to 384 kbps or higher, for example) packet-switched communications between mobile units 20 and the data network 32; and a primary traffic link, including the carriers 26, the base stations 18, and the primary traffic system controller 42 to provide speech and other circuit-switched communications between mobile units 20 or between a mobile unit 20 and a PSTN unit.

In one example arrangement, the primary traffic system controller 42 controls communications according to the IS-136 protocol. In another example, the primary traffic system controller 42 may control communications according to the GSM protocol, which uses 200-kHz carriers, instead of 30-kHz carriers, to carry primary traffic. In the primary traffic link, TDMA frames may be used to carry traffic and control signals. A frame according to IS-136 includes six time slots, while a frame according to GSM includes eight time slots. In the packet data link, frames are also defined to carry data traffic and associated control signals. The frame for the packet data link may be similar to a GSM frame with eight time slots (also referred to as burst periods) TN0–TN7 (described further below in connection with FIGS. 6–8).

In the illustrated embodiment, the data traffic system controller 40 and the primary traffic system controller 42 (implementable with software or a combination of software and hardware) may be implemented in separate platforms (the data traffic service node 35 and the MSC 12, respectively). In an alternative embodiment, the system controllers 40 and 42 may be implemented in the same platform. Similarly, transceivers for sending and receiving carriers 26 and 28 may be included in the same base station 18 or in separate base stations.

Figure 3:
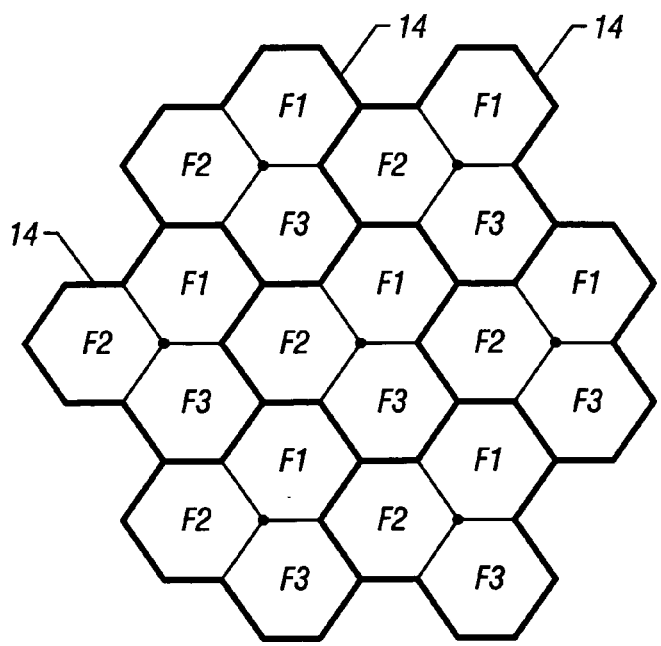
FIG. 3 illustrates a 1/3 channel reuse pattern for packet data traffic communicated over the packet-switched data link in the mobile communications system of FIG. 1A.

In one arrangement, each cell may be divided into three sectors. The primary traffic link may utilize a 7/21 channel reuse pattern. The frequency reuse distance D for a 7/21 channel reuse pattern is large enough such that the C/I (carrier-to-interference) performance of control channels on the primary traffic link is robust. With the packet data link, however, each base station site is allocated three frequencies F1, F2, and F3 (see also FIG. 2), one per sector, using a 1/3 frequency reuse pattern for data traffic, as illustrated in the tricellular representation of FIG. 3. As is generally known in the art, an equivalent trisector representation may also be employed to show the cellular arrangement of FIG. 3. One frequency Fx is allocated per sector of each cell 14. Data traffic in the packet data link may employ various mechanisms, including link adaptation and incremental redundancy, to provide more robust C/I performance in a 1/3 channel reuse pattern. However, for control signals in the packet data link, the 1/3 channel reuse pattern is vulnerable to interference because the same frequencies are reused within relatively small distances of each other, as shown in FIG. 3. To provide more robust C/I performance, a higher effective channel reuse pattern, e.g., 3/9, 4/12, and other patterns, may be employed in accordance with some embodiments. This is made possible by creating time groups so that control channels may be staggered in time to create the higher effective channel reuse pattern.

Figure 4:
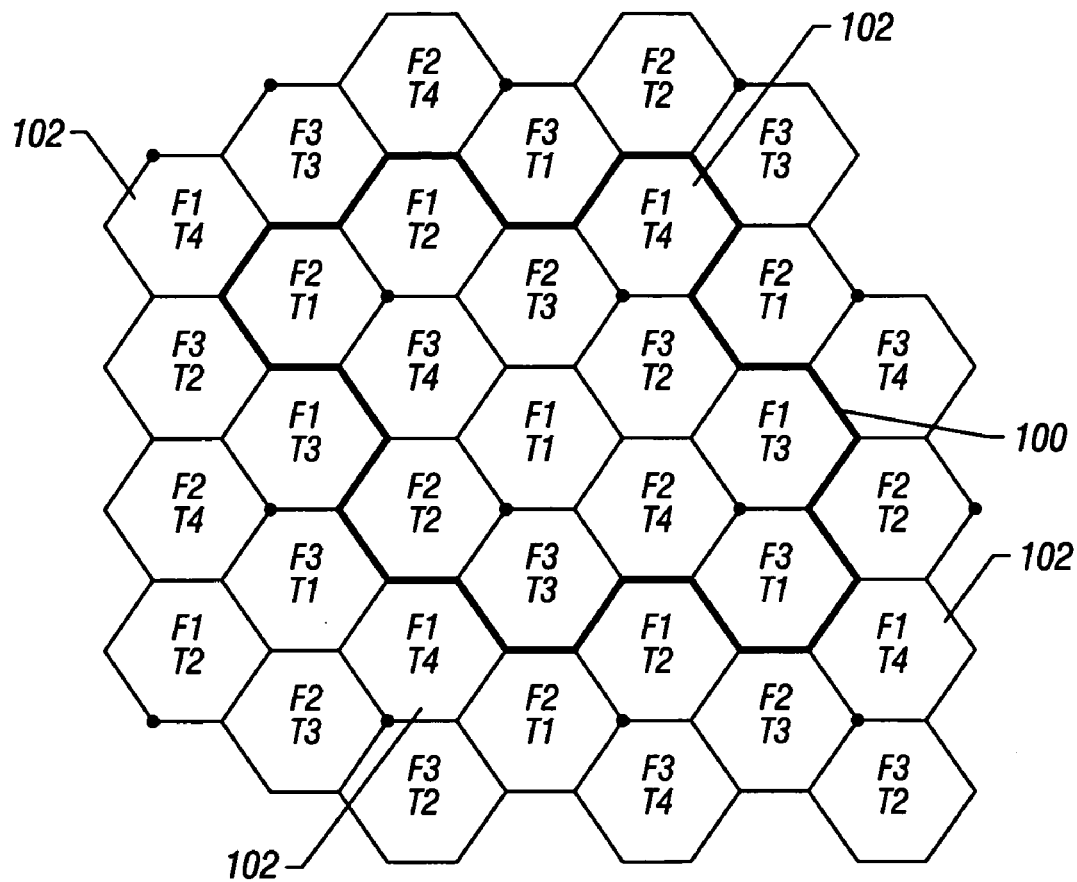
FIGS. 4 and 5 illustrate effective 4/12 and 3/9 channel reuse patterns in accordance with some embodiments that may be employed by the packet-switched data link of the mobile communications system of FIG. 1A.

Referring to FIG. 4, an effective 4/12 channel reuse pattern is illustrated. In the 4/12 pattern, four time groups (T1–T4) are created. Thus, in addition to a reuse pattern based on the three frequencies F1–F3, the reuse pattern also has an orthogonal aspect based on time (T1–T4). Thus, each sector is assigned a frequency Fx as well as a time group Ty. With three frequencies F1, F2, and F3 and four time groups T1, T2, T3, and T4, a cluster 100 of 12 sectors can be defined. The cluster 100 is then repeated to provide the effective 4/12 channel reuse pattern. In effect, time reuse that is added on top of frequency reuse creates a higher effective channel reuse pattern for control channels on the packet data link, thereby creating more robust performance with reduced interference problems.

As illustrated in FIG. 4, a sector having a certain frequency Fx in time group Ty is separated by some distance from another sector having the same frequency Fx and being in the same time group Ty (generally the distance provided by the width and length of each cluster 100). For example, the sectors 102 having frequency F1 and belonging to time group T4 are separated by relatively large distances from each other to reduce the likelihood of interference.

Another advantage offered by the effective 4/12 channel reuse pattern as illustrated in FIG. 4 is that adjacent channel interference is reduced between the F1 and F2 carriers and the F2 and F3 carriers. For any given sector having frequency Fx and assigned time group Ty, no adjacent sector is assigned the same time group Ty. For example, the sector 102 is associated with F1 and T4. The sectors adjacent the sector 102 are in one of time groups T1–T3 but not T4. Since adjacent sectors are communicating control channels in different time periods, interference between adjacent carriers (F1, F2, F3) is reduced. As a result, guard bands do not need to be defined between the carriers F1, F2, and F3, which allows for reduced frequency spectrum allocation for carriers used to communicate packet data.

Figure 5:
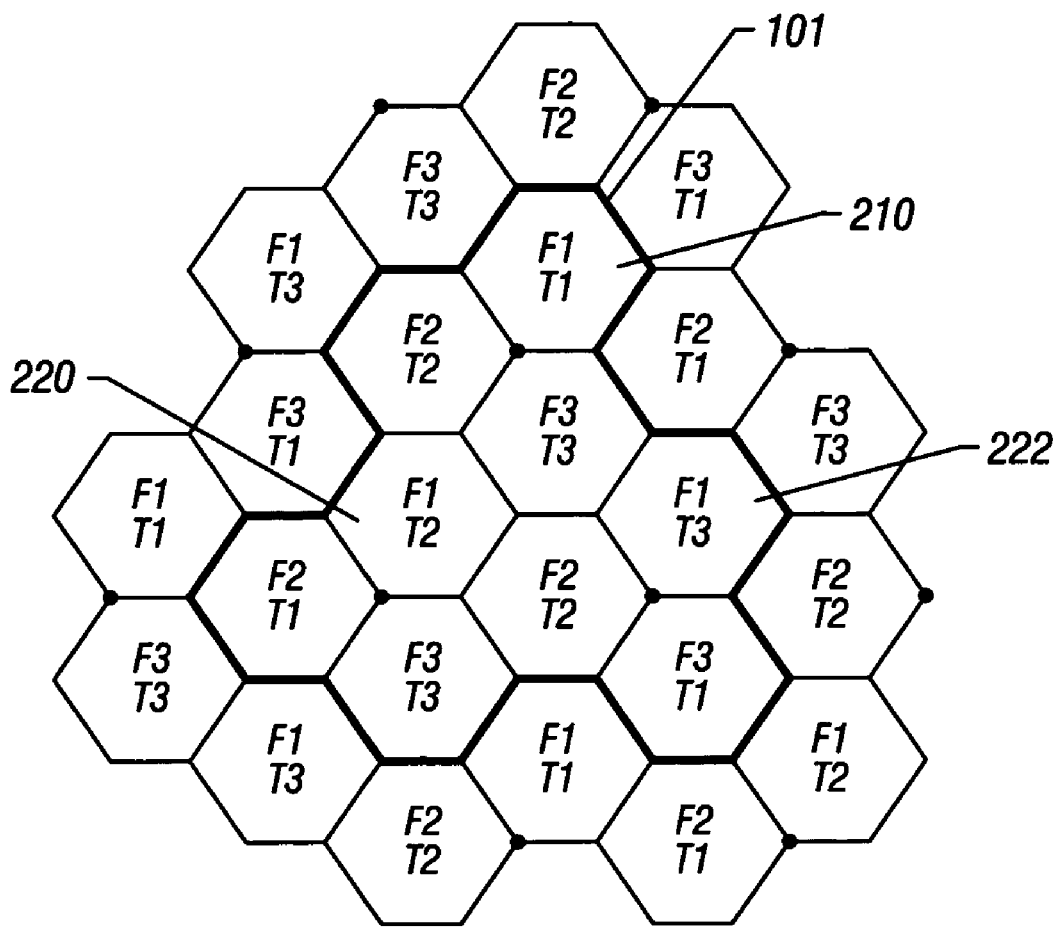

Referring to FIG. 5, a 3/9 effective reuse pattern is illustrated. The 3/9 reuse pattern utilizes three time group T1, T2 and T3. This effectively provides a cluster 101 of nine sectors in which each sector has a distinct combination of a frequency Fx and time group Ty. With the effective 3/9 channel reuse pattern, the reduced adjacent channel interference feature as offered by the effective 4/12 reuse pattern is not available. To reduce interference between adjacent carriers F1, F2, and F3, guard bands between the carriers may need to be defined.

More generally, the packet data link may employ a 1/N channel reuse pattern based on N channel frequencies that may be allocated among N cell sectors. To provide a higher effective channel reuse pattern, M time groups can be defined to provide an effective M/(M*N) channel reuse pattern, provided a sufficient number of slots are contained in frames to provide a M time groups. Alternatively, instead of one frequency per cell sector, the N channel frequencies may be divided into groups of two or more with a group allocated to each sector. Such techniques to provide higher effective channel reuse patterns may be employed also with non-sectored cells. Thus, cell segments in each cluster are allocated different combinations of frequencies and time groups.

To enable the creation of time groups so that they can be allocated among sectors of each cluster (100 or 101) to provide higher effective channel reuse, the base stations 18 are time synchronized with each other. This may be performed by using a global positioning system (GPS) timing receiver or some other synchronization circuit 19 (FIG. 1) in each base station 18. Synchronization of the base station 18 is employed to ensure alignment of the time groups in the cell sectors. Base station synchronization is carried out such that the following two criteria are satisfied. TDMA frames (including time slots TN0–TN7) of the packet data link are aligned with each other in all sectors. Thus, time slot TN0 occurs at the same time at each base station site in each sector, to within tolerances of the synchronization equipment and any differences in propagation delays. Further, according to one embodiment, the control and traffic channels of the data link are carried by a multiframe structure (discussed further below in connection with FIGS. 9–11). Each multiframe structure starts with frame 0 and continues to frame NN (e.g., 50 or 51). When time synchronized, frame 0 occurs at the same time in each sector. However, as will be described further below, propagation delays due to large cell sizes may cause overlap of time slots in neighboring cells. If interference occurs in a time slot carrying control signaling, then time synchronization of the base stations may effectively be destroyed. As a result, the 4/12, 3/9, or other effective channel reuse pattern that is based on both frequencies and time groups may revert back to a 1/3 channel reuse pattern based on frequency but not time. This may cause unacceptable C/I performance due to interference of control channels. To address this, increased guard periods are provided, as further described below.

Figure 1B:
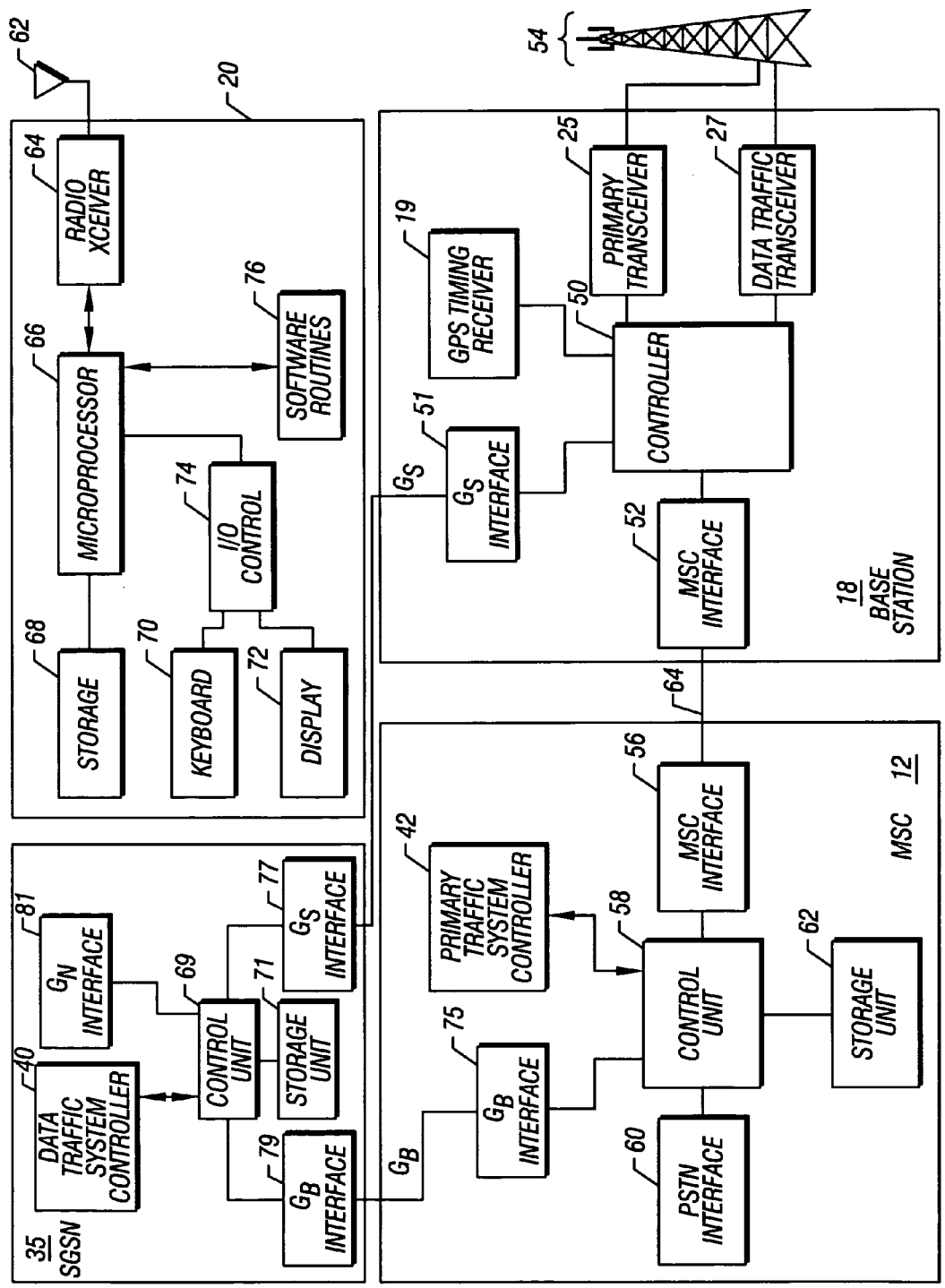
FIG. 1B is a block diagram of components in a mobile switching center (MSC), a base station, a data traffic service node, and a mobile unit in the mobile communications system of FIG. 1A.

Referring to FIG. 1B, components of the MSC 12, a base station 18, the data traffic service node 35, and a mobile unit 20 are illustrated. In the base station 18, the primary traffic transceiver 25 and packet data traffic transceiver 27 are connected to an antenna tower 54 that transmits and receives the first and second sets of carriers 26 and 28. The primary traffic and packet data traffic transceivers 25 and 27 are connected to a controller 50, which may be implemented in hardware or a combination of hardware and software. Also connected to the controller 50 is a GPS timing receiver or other synchronization circuit 19 that allows synchronization of all base stations in the group of cells 14 controlled by the MSC 12 and the data traffic service node 35. Further, the base station 18 includes an interface 52 that is coupled to a link 64 (e.g., a T1 link) that is in turn coupled to an interface unit 56 in the MSC 12. The base station also includes an interface 51 (which in one embodiment is a $G_s$ interface 51 according to GPRS) for communicating over a link (e.g., a $G_s$ link) to the data traffic service node 35.

In the MSC 12, a control unit 58 provides the processing core of the MSC 12. The control unit 58 may be implemented with computer systems, processors, and other control devices. The control unit 58 is connected to a storage unit 62, which may contain one or more machine-readable storage media to store various data as well as software routines or modules that are loadable for execution by the control unit 58. For example, instructions of routines or modules that make up the primary traffic system controller 42 may be stored in the storage unit 62 and loaded for execution by the control unit 58. The MSC 12 may also include a PSTN interface 60 that is coupled to the PSTN 16 to allow communications with a PSTN-connected unit. Further, the MSC 12 includes an interface 75 (e.g., a $G_b$ interface) for communicating over a link (e.g., a $G_b$ link) to the data traffic service node 35.

The data traffic service node 35 includes interface units 77 and 79 for communicating over the $G_s$ and $G_b$ links, respectively, in one embodiment. The processing core of the data traffic service node 35 includes a control unit 69, which may be implemented with computer systems, processors, or other control devices. A storage unit 71 including machine-readable storage media is coupled to the control unit 69. Instructions of routines and modules that make up the data traffic system controller 40 may be initially stored in the storage unit 71 and loaded by the control unit 69 for execution. The data traffic service node 35 further includes an interface 81 (e.g., a $G_n$ interface) for communicating with the GGSN 36 (FIG. 1A). In another embodiment, the interface 81 may be a network interface controller or other transceiver capable of communicating over the data network 32. In further embodiments, the data traffic and primary traffic system controllers 40 and 42 may be implemented in one platform and executable by the same control unit.

Carriers are communicated between the antennas 54 coupled to the base station 18 and an antenna 62 of a mobile unit 12. In one example arrangement of the mobile unit 12, one or more radio transceivers 64 are connected to the antenna 62 to send and receive packet data carriers and primary traffic carriers. A microprocessor 66 (or one or more other suitable control devices) may be coupled to the one or more radio transceivers 64. The microprocessor 66 is coupled to a storage unit 68, which may be in the form of a non-volatile memory (such as a flash memory or an electrically erasable and programmable read-only memory) and/or dynamic and static random access memories (DRAMs and SRAMs). Software routines 68 executable on the microprocessor 66 may be initially stored in a non-volatile portion of the storage unit 68. An input/output (I/O) controller 74 is coupled to the keyboard 70 and display 72 of the mobile unit 20.

Figure 1C:
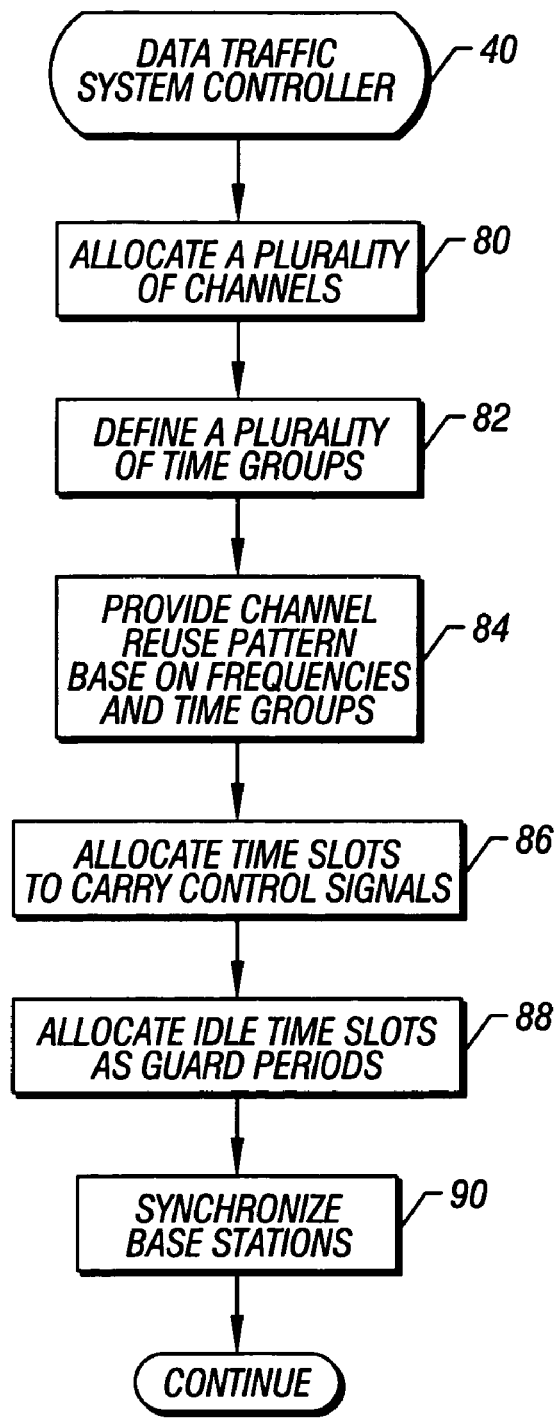
FIG. 1C is a flow diagram of tasks performed by a data traffic system controller in the data traffic service node of FIG. 1B in creating higher effective channel reuse plans in accordance with some embodiments.

Referring to FIG. 1C, tasks performed by the data traffic system controller 40 in the data traffic service node 35 to set up the higher effective channel reuse pattern for the packet data link in accordance with some embodiments are illustrated. First, the data traffic system controller 40 allocates (at 80) a predetermined number of channels. In one embodiment, three channels having frequencies F1, F2, and F3 are allocated one to each sector of each tri-sector cell 14. Next, the data traffic system controller 40 defines (at 82) a plurality of time groups. In one embodiment, three time groups T1, T2, and T3 may be defined. In another embodiment, four time groups T1, T2, T3, and T4 may be defined. Based on the channel frequencies F1–F3 and time groups T1–T3 or T1–T4, the data traffic system controller 40 provides (at 84) a channel reuse pattern for communications over the packet data link. Next, the data traffic system controller 40 may allocate (at 86) the time slots used to carry certain control signals, as well as allocate (at 88) idle time slots to provide guard periods. Such allocation is described further below. In addition, based on synchronization information received by the synchronization circuit 19 (which may include a GPS timing receiver), the data traffic system controller 40 may synchronize (at 90) the timings of signal transmissions and receptions, from base stations 18 in all the cells 14 of control signals, so that they are aligned in time.

The channels employed in the packet data link include packet broadcast control channels (PBCCH), packet common control channels (PCCCH), and packet data traffic channels (PDTCH). The broadcast control channels PBCCH, communicated downlink (from base station to mobile unit), provide general information on a per base station basis (e.g., cell/sector specific information) including information employed for mobile units 20 to register in the system 10. The common control channels PCCCH carry signaling information used for access management tasks (e.g., allocation of dedicated control channels and traffic channels). PCCCH includes a packet paging channel (PPCH) and a packet access grant channel (PAGCH) for downlink communications, and PCCCH includes a packet random access channel (PRACH) for uplink communications (mobile unit to base station). PRACH is used by a mobile unit 20 to request access to the system 10. PPCH is used by the base station 18 to alert a mobile unit 20 of an incoming call. PAGCH is used to allocate a channel to a mobile unit 20 for signaling to obtain a dedicated channel following a request by the mobile unit 20 on PRACH. Other control channels include a packet frequency correction channel (PFCCH) and a packet synchronization channel (PSCH). PFCCH and PSCH are used to synchronize a mobile unit 20 to the time slot structure of each cell by defining the boundaries of burst periods and time slot numbering. In one embodiment, the control channels discussed above are extensions of circuit-switched logical channels used in a GSM system.

The control channels that are communicated with the higher effective 3/9, 4/12, or other channel reuse pattern include PBCCH, PCCCH, PFCCH, and PSCH. The data traffic channels PDTCH and associated traffic control channels, PTCCH (packet timing advance control channel) and PACCH (packet associated control channels) use the 1/3 reuse pattern, since traffic channels employ various mechanisms, as noted above, to better withstand interference from neighboring cell segments.

Figure 6:
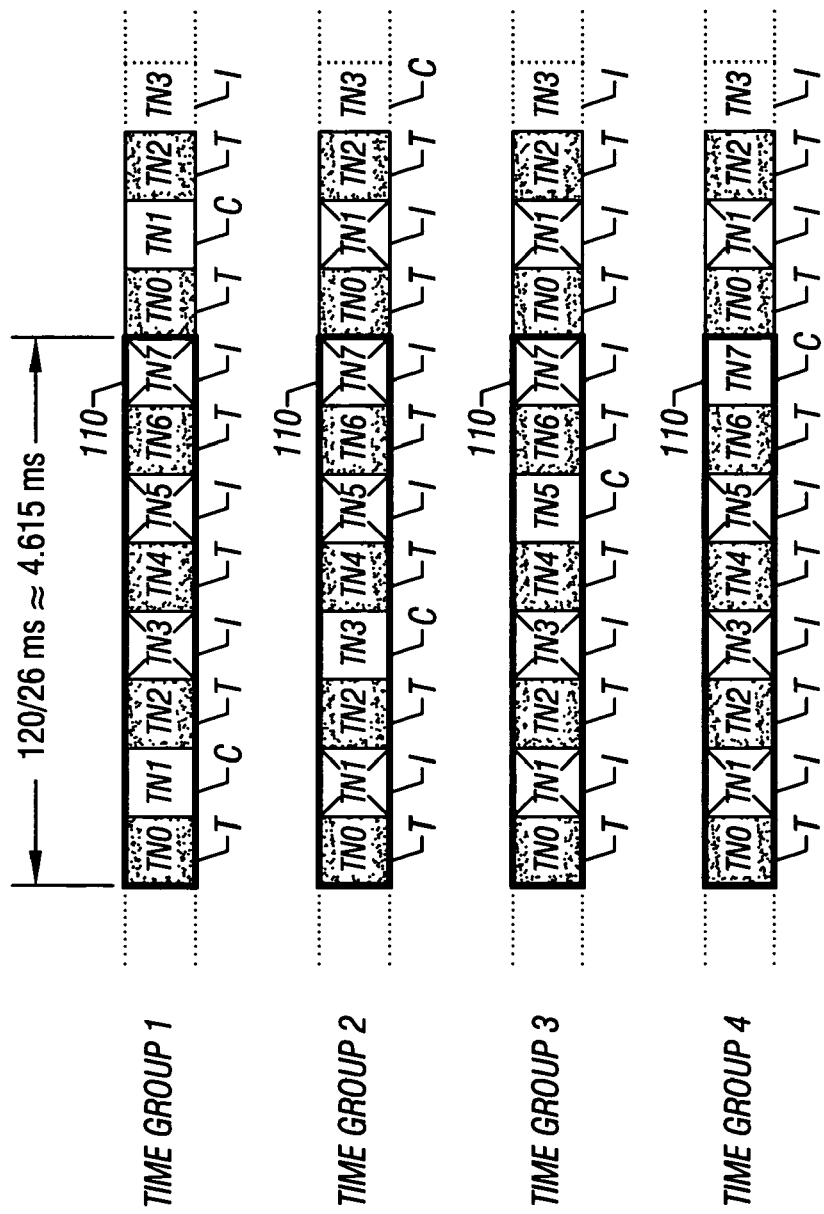

Referring to FIG. 6, each carrier (F1, F2 or F3) in the packet data link carries a TDMA frame 110 that is divided into a plurality of time slots. In the illustrated embodiment, eight time slots (or burst periods) TN0–TN7 are used. However, in further embodiments, a carrier may be divided into a smaller or larger number of time slots. In one embodiment, each TDMA frame 110 is structured like a GSM frame and has a length of 120/26 ms (or about 4.615 ms). To provide an effective 4/12 reuse pattern, control channels are staggered across four different time groups. In the illustrated embodiment, in time group 1, control channels (PBCCH, PCCCH, PFCCH, and PSCH in one embodiment) are transmitted during time slot TN1; in time group 2, control channels are transmitted in time slot TN3; in time group 3, control channels are transmitted during time slot TN5; and in time group 4, control channels are transmitted during time slot TN7. By staggering the control channels into different time slots as illustrated, a channel reuse pattern may be divided according to both frequency and time.

As illustrated in FIG. 6, the time slots are marked as one of a T time slot (during which packet data traffic is communicated), a C time slot (during which control signals are communicated), and an I time slot (during which all traffic and control channels are idle in blocks that transmit PBCCH and PCCCH on other time groups but which transmit packet data traffic otherwise, as explained below in connection with FIGS. 10 and 11). In one embodiment, a block includes four frames of a multiframe structure (e.g., a 51- or 52-frame multiframe).

Figure 7:
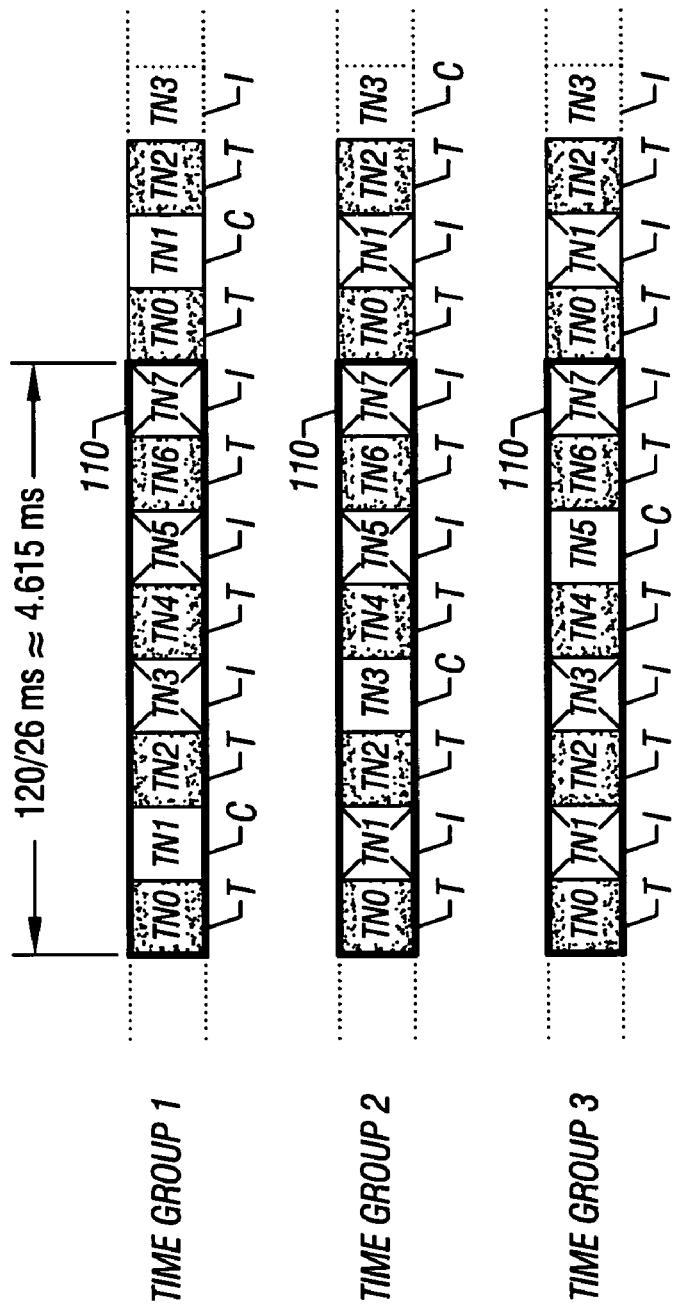

Referring to FIG. 7, an effective 3/9 reuse pattern includes three time groups T1, T2 and T3. In the illustrated embodiment, the control channels are placed in time slot TN1 (in time group T1), time slot TN3 (in time group T2), and time slot TN5 (in time group T3). The time slots that carry control channels are indicated as being C time slots. Also illustrated in FIG. 7 are T time slots (during which packet data traffic may be transmitted) and I time slots (which are idle during blocks that transmit PBCCH or PCCCH in other time groups but which carry packet data traffic otherwise).

Alternatively, the control channels may be carried in time slots other than TN1, TN3, TN5 or TN7 (FIG. 6) or TN1, TN3, or TN5 (FIG. 7). For example, instead of placing control channels in odd time slots TN1, 3, 5 and 7, the control channels may be placed in time slots TN0, TN2, TN4, and TN6 in the different time groups. Other staggering schemes may also be employed, with some control channels communicated in even time slots and others communicated in odd time slots, for example. Referring to the example of FIG. 8, which shows a 3/9 reuse pattern, control channels may be placed in the C time slots: time slot TN0 in time group 1, time slot TN2 in time group 2, and time slot TN4 in time group 3. The T time slots carry data traffic, and the I time slots are idle during blocks that transmit PBCCH or PCCCH in other time groups but carry packet data traffic otherwise. With larger or smaller numbers of time slots, other staggering schemes can be provided to provide fewer or larger numbers of time groups.

Figure 10A:
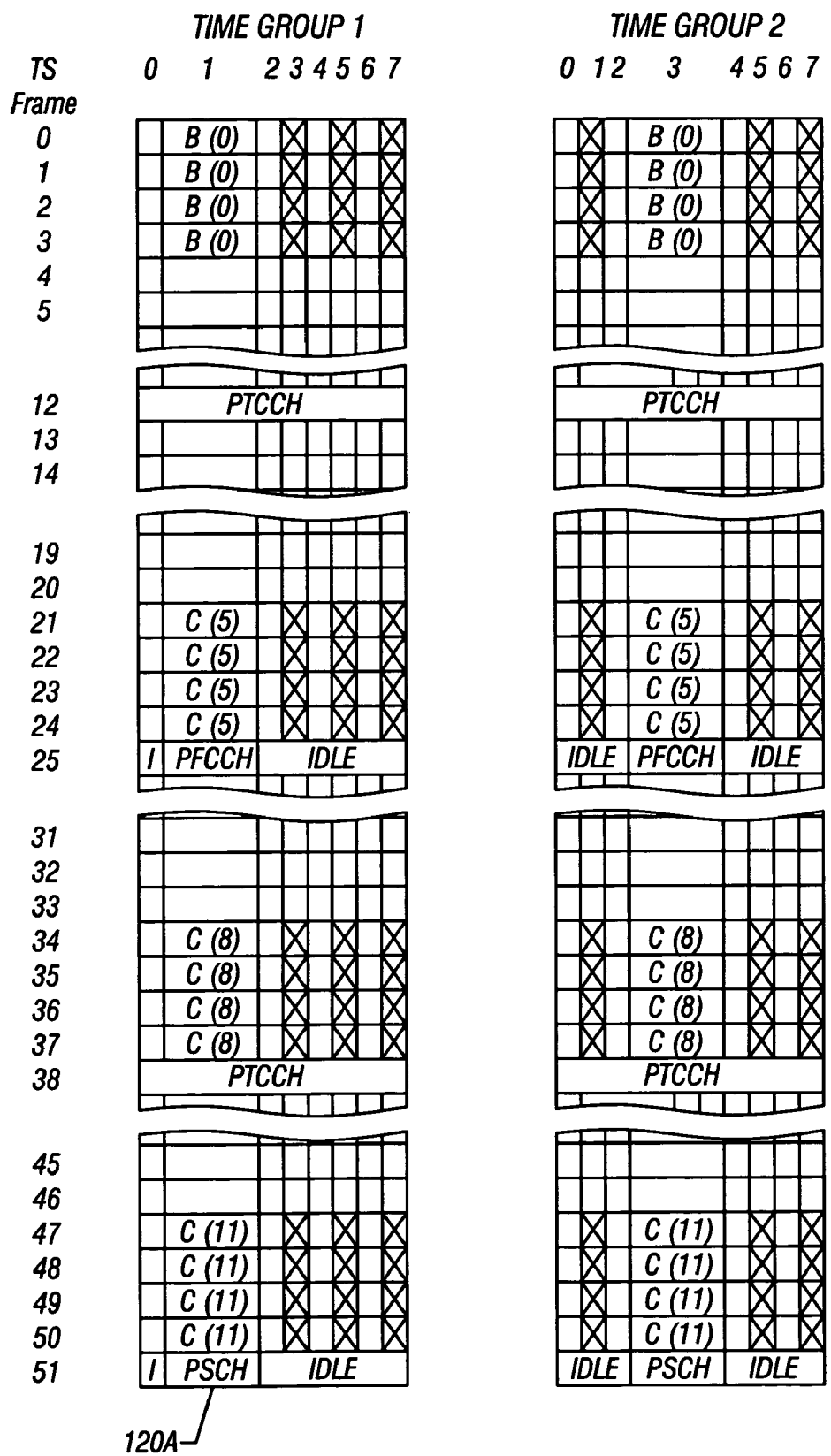
FIGS. 10A, 10B, and 11 illustrate multiframes in several time groups in accordance with some embodiments for carrying packet data traffic and control channels in the packet-switched data link.
Figure 10B:
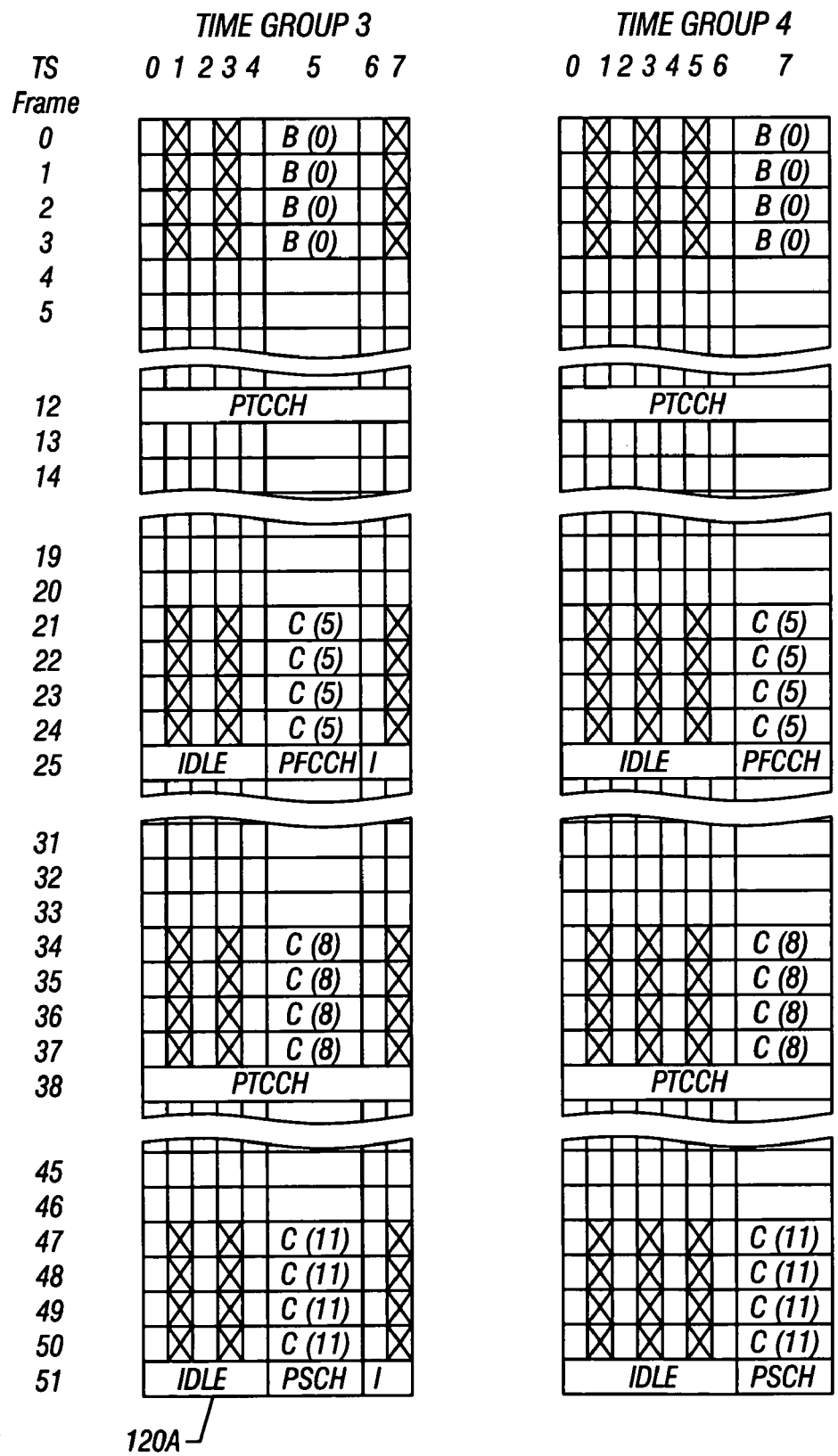
Figure 11:
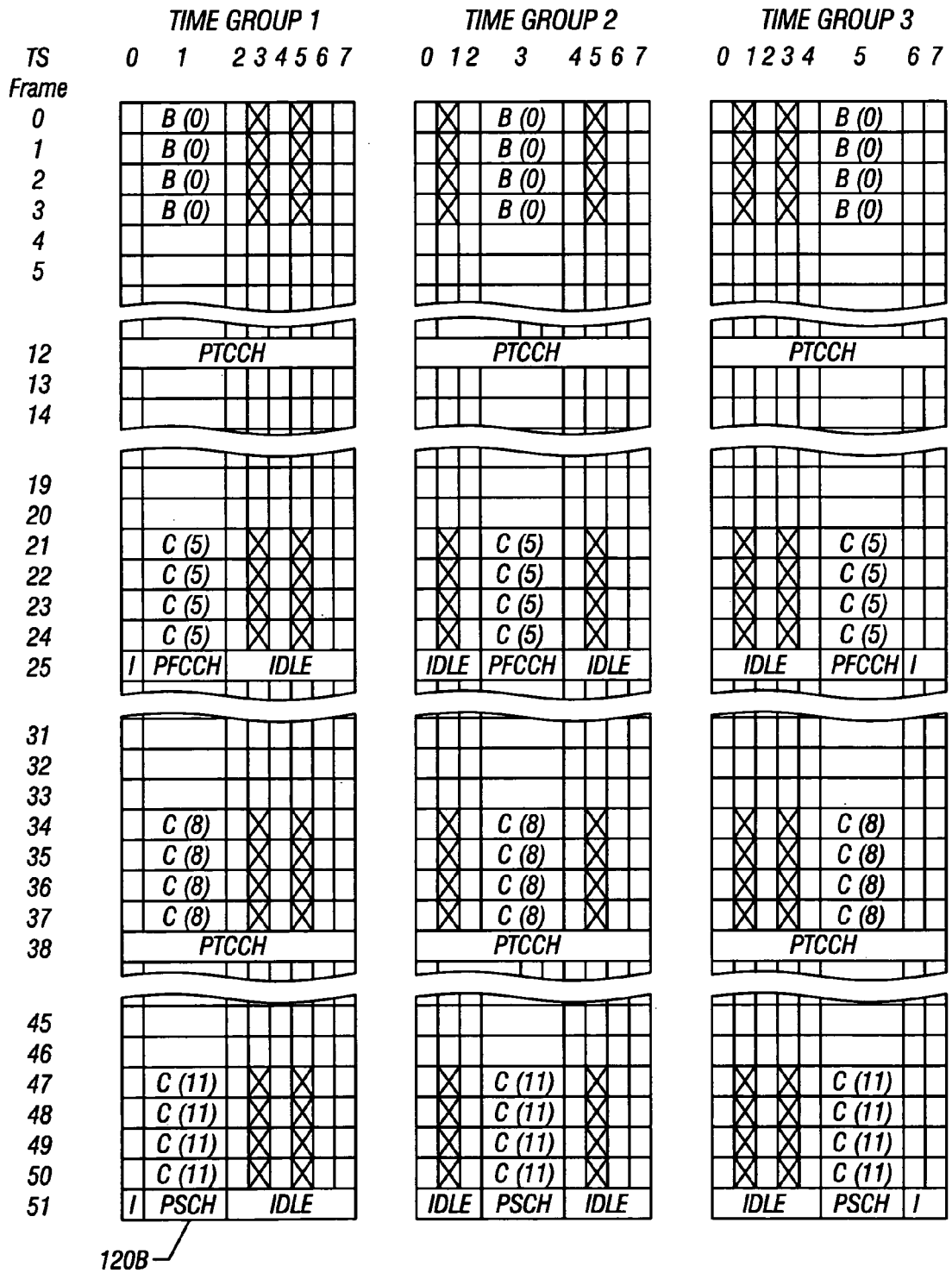

Referring to FIGS. 9–11, communication using 52-frame multiframes 120A and 120B in accordance with some embodiments is illustrated. The structure of a multi frame 120 is illustrated in FIG. 9. Each multiframe 120 includes 52 TDMA frames (FRN 0–51), which are divided into 12 blocks B0–B11, leaving four frames FRN 12, 25, 38, and 51 to carry predetermined channels. In further embodiments, other multiframe structures may be used, such as a 51-frame multiframe. For each time group (1, 2, 3, or 4), the eight columns of the multiframe 120 correspond to the eight time slots TN0–TN7, and the 52 rows correspond to the 52 frames of the multiframe 120. FIGS. 10A and 10B illustrate a multiframe structure 120A employing an effective 4/12 reuse pattern, and FIG. 11 illustrates a multiframe structure 120B employing an effective 3/9 reuse pattern.

In the illustrated example of FIGS. 10A, 10B, and 11, three blocks are assigned to PCCCH (frames containing a C) and one block is assigned to PBCCH (frames containing a B). A block includes four TDMA frames. The number of blocks allocated for PBCCH and PCCCH is flexible, from two up to 12 blocks per time slot in each multiframe 120. In the illustrated examples, PBCCH is carried in block B0, and PCCCH is carried in blocks B5, B8, and B11. Frames FRN 25 and 51 carry PFCCH and PSCH, respectively, and frames FRN 12 and 38 carry PTCCH.

Frames marked with an "X" are idle, and correspond to the odd time slots (TN1, TN3, TN5, or TN7) in blocks (0, 5, 8, and 11) that carry control channels PBCCH and PCCCH in other time groups. Thus, for example, the frames in block B0 in time slot TN3 in each of time groups 1, 3, and 4 are idle because the frames in time slot TN3 of time group 2 carries PBCCH. The same is true also for frames in blocks B5, B8, and B1 in time slots TN1, 3, 5, or 7 that do not carry control signaling.

Because the base stations 18 are time synchronized for the packet data link, path delays due to relatively large cells (cells of greater than a predetermined size) may potentially cause problems for the effective 3/9 or 4/12 channel reuse pattern. Because of path delays in relatively large cells, time slots of neighboring cell sectors, as received by a mobile unit, may overlap each other. A mobile unit 20 monitors signal strengths of control signals from a group of neighboring cell sectors to select or reselect the cell sector providing the strongest signal strength. However, because the mobile unit 20 may be located closer to a first base station 18 than a neighboring base station 18, propagation delays due to distances involved in relatively large cells can cause overlap of packet data traffic and control signals in different time slots of the first and neighboring base stations, which may violate the requirement that the time slots be aligned due to inter-base station synchronization.

To address this issue, predetermined time slots are employed for carrying control channels, including PSCH and PFCCH, which are used to perform cell selection and reselection. By using the predetermined time slots of a TDMA frame to carry control signaling, the guard period between packet data traffic channels and the control channels may be increased to provide superior protection in relatively large cells.

As a mobile unit 20 moves in a cell sector or between cell sectors, it continues to monitor PSCH and PFCCH from neighboring cell sectors to allow the mobile unit 20 to select or reselect the strongest signal. The mobile unit 20 accomplishes this by measuring the PSCH and PFCCH bursts during predetermined frames. The measurement is made during the mobile unit's 12 BP+ε data measurement period (also referred to as the measurement window) of all neighboring cells.

Figure 12:
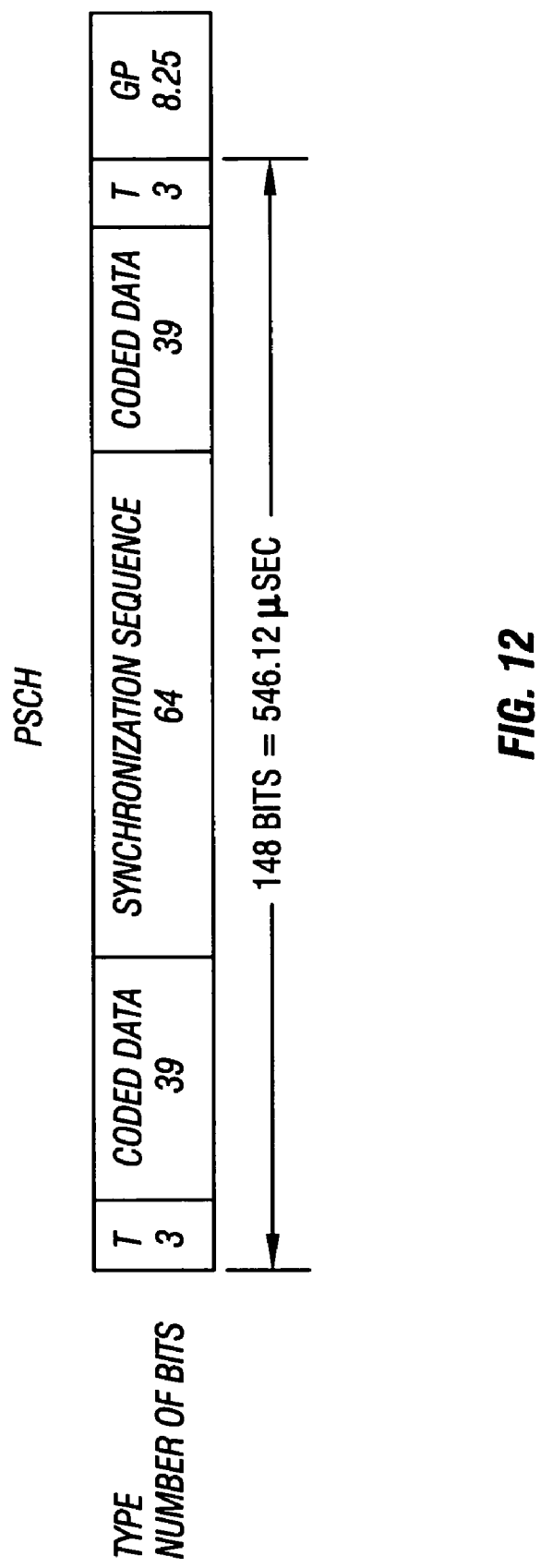
FIG. 12 illustrates a synchronization burst for use in the packet-switched data link.

Theoretically, for a normal interference case, the frequency reuse distance $D_R$ for a cell can be expressed as $$D_R = \sqrt{3N}R, \quad \text{(Eq. 1)}$$

where N is the frequency reuse pattern and R is the cell radius. Thus, for N having the value 1 (a 1/3 frequency reuse pattern), the value of $D_R$ is 1.73R. Referring to FIG. 12, a PSCH burst is illustrated. In one embodiment, the PSCH burst is 148 bits long plus a guard period (GP) of 8.25 bits (symbols). The PFCCH burst also has the same length as the PSCH burst and is also associated with a guard period of 8.25 bits. Other control channel bursts including PBCCH and PCCCH have the same length and guard period. However, the internal structures of PFCCH, PBCCH, and PCCCH differ from that of PSCH as illustrated in FIG. 12.

Since the duration of a single bit is approximately 3.69 microseconds (μsec) in one embodiment, the guard period (GP) is about 30.44 μsec in length. This translates into approximately 9 kilometers (km). Using Eq. 1, in which $D_R$ is equal to about 9 km, the estimated maximum cell size (defined by its radius) is approximately 5 km, much less than cell sizes supported by GSM or IS-136. Thus, a large cell according to one example embodiment may be defined as a cell of greater than approximately 5 km (the maximum cell size supported). In further embodiments, a large cell may be defined to be larger than other predetermined sizes.

As discussed above, to provide for higher effective reuse patterns, sectors are divided according to both frequency and time. In one embodiment, the PSCH bursts may be placed in the even time slots (TN0, TN2 or TN4) for an effective 3/9 reuse or TN0, TN2, TN4, TN6 for an effective 4/12 reuse. Thus, referring to FIG. 5, each cell 14 includes three sectors that have been divided into three separate time groups as well as three separate frequencies. In one embodiment, in time groups T1–T3, control channels are carried in time slots TN0, TN2, and TN4, respectively, of each TDMA frame. FIG. 8 illustrates placement of control channels including the PSCH and PFCCH bursts in time slots TN0, TN2 and TN4 in an effective 3/9 channel reuse pattern.

The following describes an example of how overlapping of packet data traffic channels PDTCH and control channels (including PBCCH and PCCCH) may occur. As shown in FIG. 8, in time groups 1, 2, and 3, packet data traffic can be transmitted in time slot TN7 (indicated as 212, 216, and 218). In time group 1, time slot TN0 (indicated as 214) carries control channels, including the PSCH and PFCCH bursts (in respective frames of the multiframe structure). As illustrated in FIG. 5, a sector 210 is located in a cell that has a neighboring cell with sectors 220 and 222 that are both allocated frequency F1. However, the sectors 210, 220, and 222 are in different time groups, with control channels being in time slot TN0 in the sector 210, time slot TN2 in the sector 220, and time slot TN4 in the sector 222. A mobile unit 20 in the sector 210, for example, may be measuring PSCH bursts in time slot 214 (TN0). However, due to propagation delays in a relatively large cell the packet data traffic being transmitted in time slot 216 (TN7) of sector 220 or time slot 218 (TN7) of sector 222 may start to slide into time slot TN0 of sector 210. The packet data traffic in TN7 is being communicated in the previous frame. Thus, for example, if frame FRN 51 is used to carry PSCH in time slot TN0 in the sector 210, then packet data traffic in frame FRN 50 in time slot TN7 (in sectors 220 and 222) may overlap into the measurement window for PSCH in TN0. Depending on the amount of overlap, this may degrade the control signaling in time slot TN0 of the sector 210.

Overlap of packet data traffic into control channels destroys the time division among the different sectors. Consequently, instead of an effective 3/9 reuse pattern as illustrated in FIG. 5, a 1/3 reuse pattern is provided which may cause unacceptable interference between control channels of different cell sectors. The likelihood of unacceptable overlap is increased as cells increase in size.

To overcome the problems associated with overlapping data traffic and control channel time slots according to some embodiments, control channels may be placed on odd time slots instead of even slots. For example, the control channels may be placed on time slots TN1, TN3, TN5 for an effective 3/9 channel reuse and on time slots TN1, TN3, TN5 and TN7 for an effective 4/12 channel reuse. By placing the control channels in odd time slots, a larger effective guard period can be provided. In accordance with this embodiment, the entire time slot TN0 can be used as a guard period to provide an effective guard period of 8.25 bits (GP from TN7 in the previous frame) plus 156.25 bits (period of TN0 plus GP). With the increased guard period, the maximum cell size supported by GSM (35 km) can be supported for high speed packet data transfers over the packet data link. Thus, although placing control signaling in even time slots TN0, TN2, TN4, and TN6 may advantageously provide for higher effective channel reuse for the control channels in normal cells (cells that are smaller than large cells), odd time slots may be used to carry control signals to provide for an increased guard period between packet data traffic and control signaling to maintain base station synchronization in large cells and therefore higher effective reuse patterns (e.g., 3/9, 4/12, and so forth). In further embodiments, different allocations of time slots for control signaling may be implemented, provided at least one time slot is provided as a guard period to protect the control signaling.

In effect, control signaling is transmitted in time slots adjacent time slots allocated as guard periods to protect the control signaling in a time slot of a first cell segment from interference by traffic signaling in another time slot of a neighboring cell segment.

Figure 13:
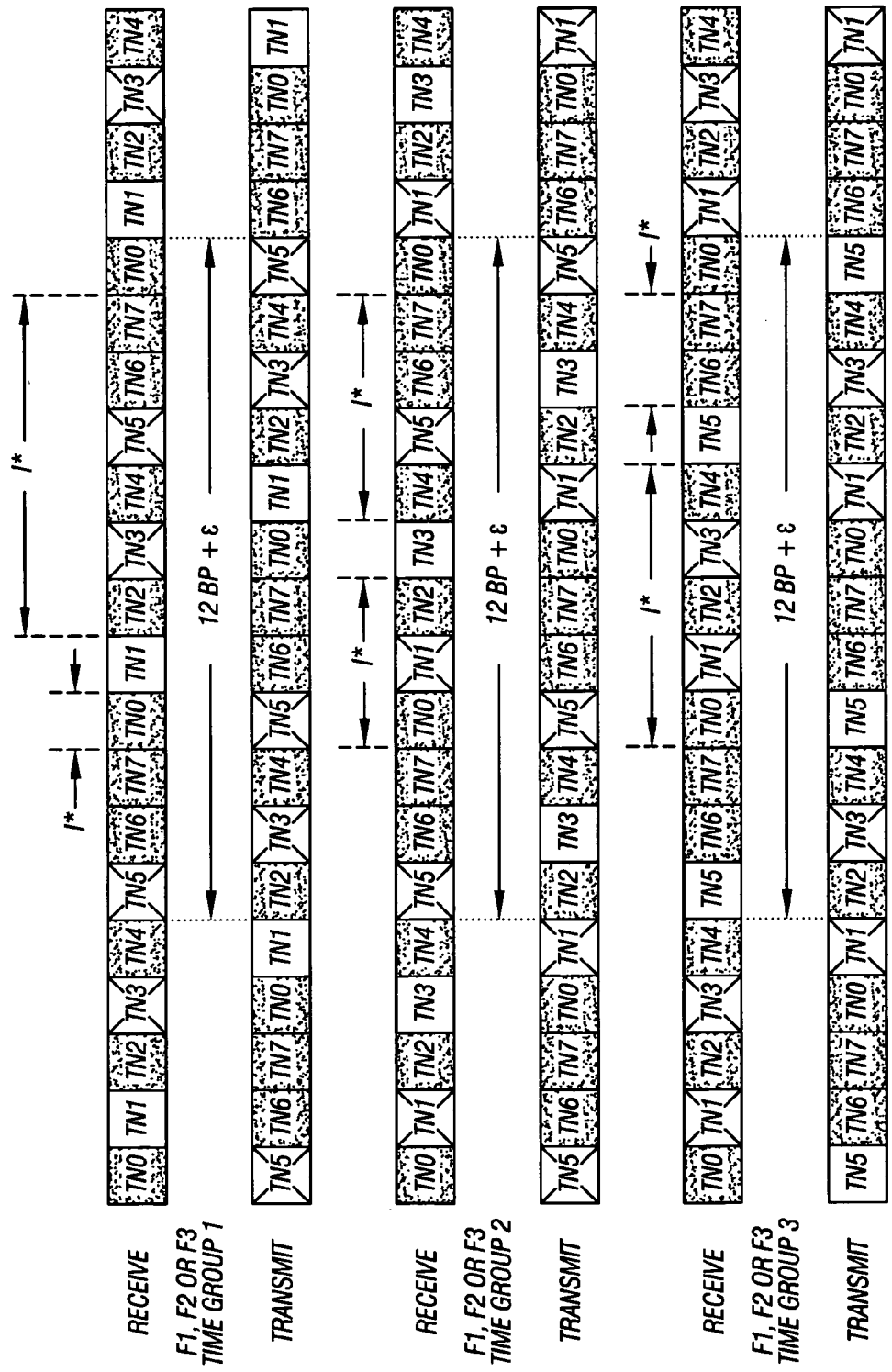
FIG. 13 illustrates TDMA frames for carrying data traffic and control channels in transmit and receive paths of the packet-switched data link.

Referring to FIG. 13, the receive (downlink) and transmit (uplink) paths are illustrated. Control channels are placed on odd time slots TN1, TN3, and TN7 for the 3/9 channel reuse pattern illustrated. The time slots between the receive and transmit paths are out of phase by three time slots. As indicated, in time group 1, the time slots TN0 and TN2–TN7 are idle in frame FRN 25 (which carries PFCCH) and frame FRN 51 (which carries PSCH). Similarly, the time slots TN0–TN2 and TN4–TN7 are idle in frames FRN 25 and 51 of time group 2, and the time slots TN0–TN4 and TN6–TN7 are idle in frames FRN 25 and 51 of time group 3. This is also illustrated in FIGS. 10A, 10B, and 11, where the idle time slots are indicated in frames 25 and 51.

Thus, during a given measurement window, indicated as 12 BP (burst periods)+ε in FIG. 13, a mobile unit 20 can measure PSCH or PFCCH (on the downlink path) in time slot TN1 in time group 1 with a guard period containing greater than the period of the entire time slot TN0 (which is idle in frames FRN 25 and 51) as protection against packet data traffic overlap. Generally, according to embodiments of the invention, control signaling can be placed in any combination of time slots, provided that an idle time slot is defined between a packet data traffic time slot and a subsequent control channel time slot. This allows inter-base station synchronization and higher effective reuse patterns to be utilized even in large cells, providing for more reliable and robust performance of the packet data link.

Another concern in a system with relatively large cell sizes is the overlap of data traffic on PDTCH with PBCCH, PCCCH, and other control channels. For example, in the effective 4/12 channel reuse arrangement of FIGS. 10A and 10B, in blocks B0, B5, B8, and B11 which carry PBCCH and PCCCH, data traffic may be carried in the time slots (0, 2, 4, and 6) adjacent the odd time slots carrying PBCCH and PCCCH. In the effective 3/9 channel reuse arrangement of FIG. 11, data traffic may be carried in time slots (0, 2, 4, 6, and 7). With larger cells, overlap of time slots may cause interference of the data traffic and control signaling.

Figure 14A:
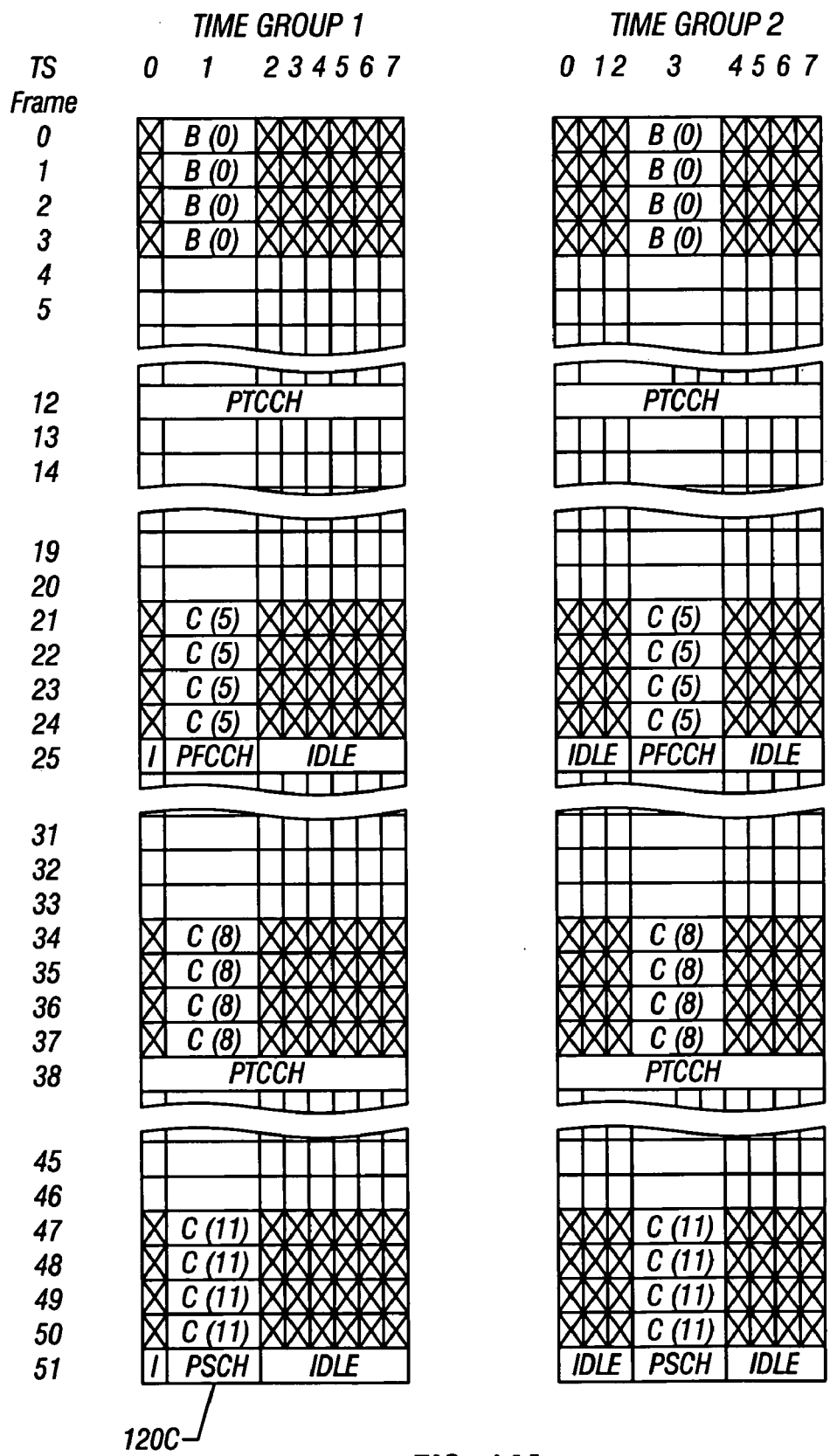
FIGS. 14A, 14B, and 15 illustrate multiframes in accordance with further embodiments for use in large cells.
Figure 14B:
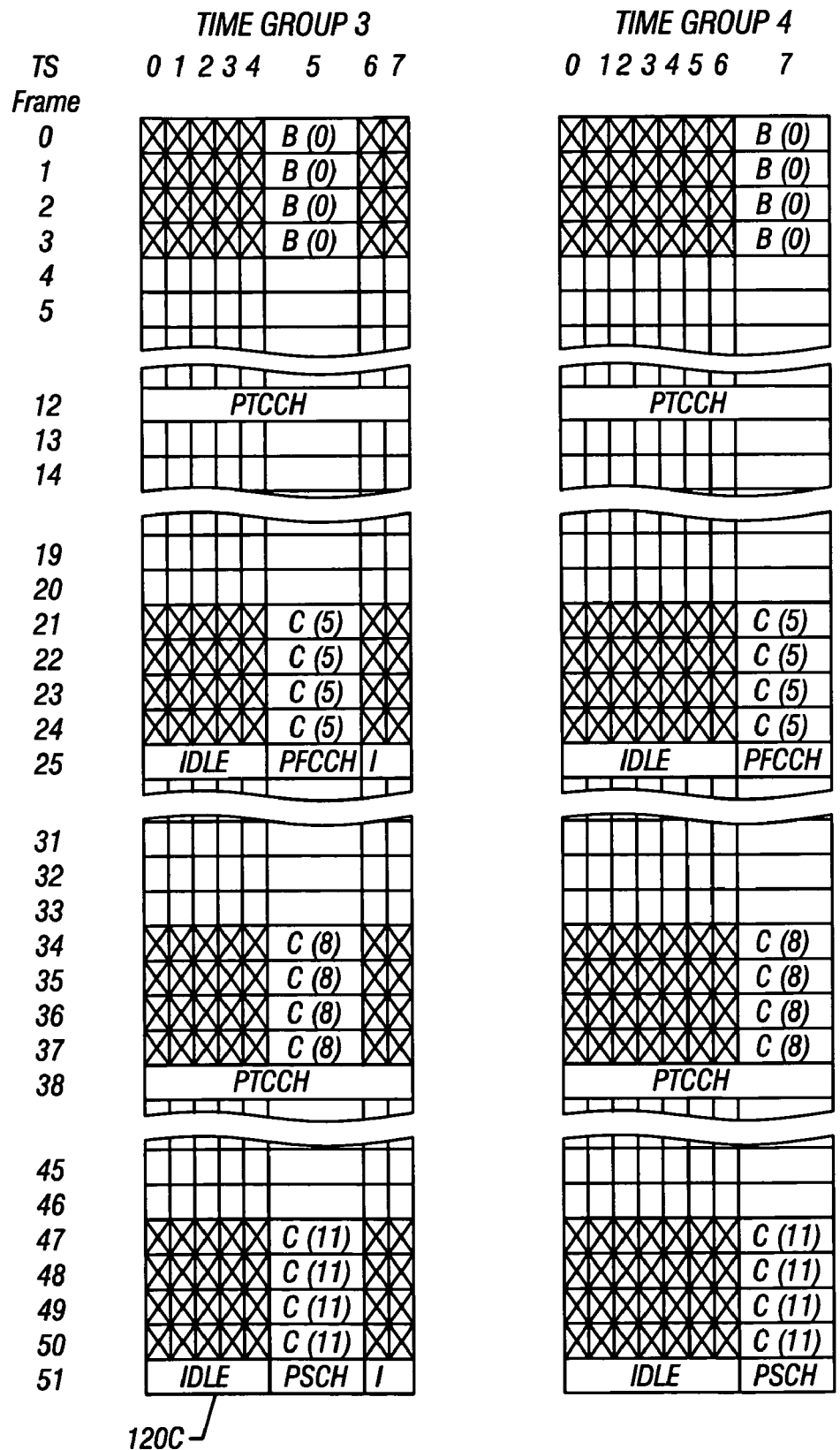
Figure 15:
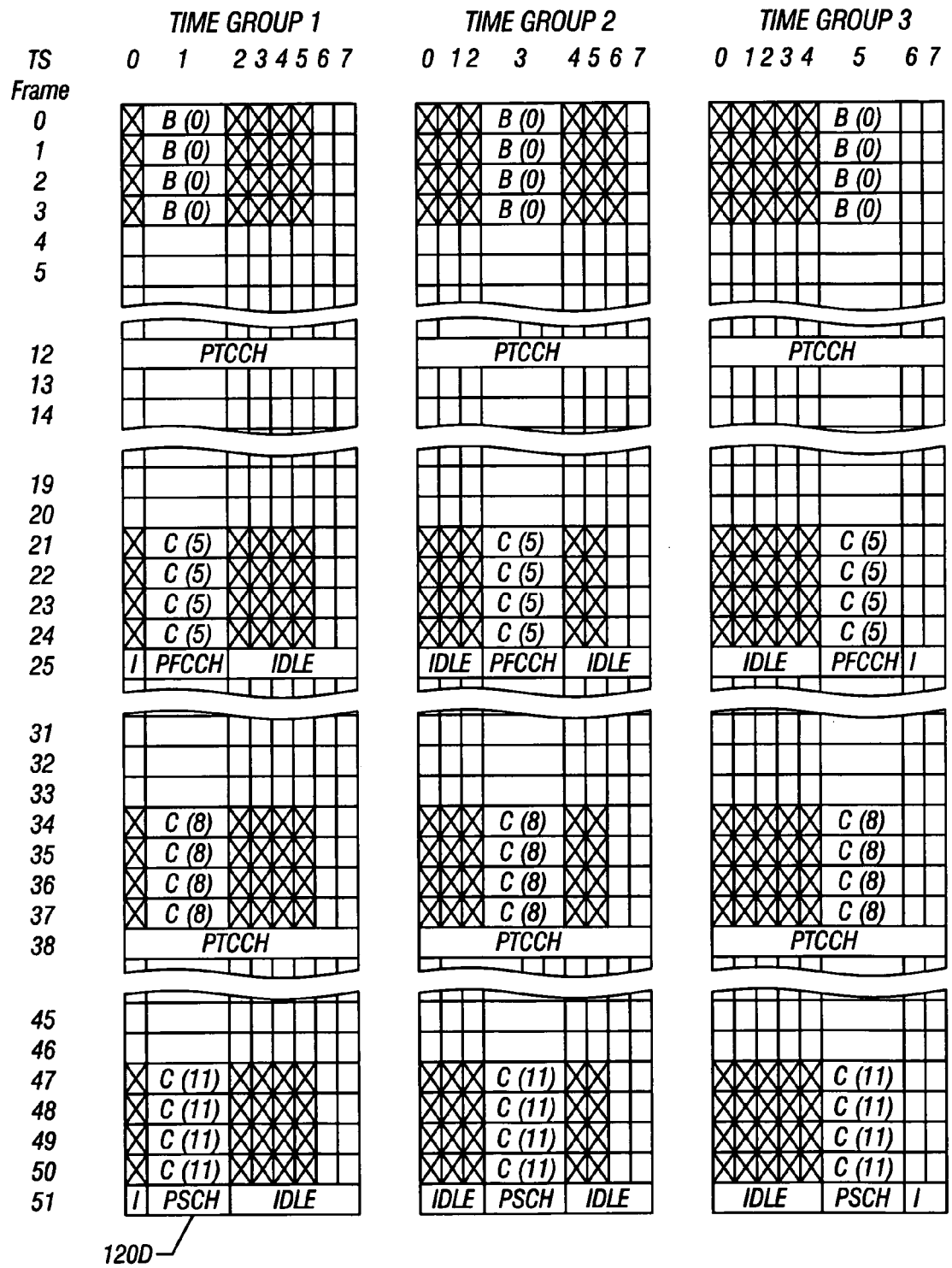

To rectify this problem in accordance with one embodiment, packet data traffic is removed from blocks carrying control channels PBCCH and PCCCH (e.g., B0, B5, B8 and B11) in time slots TN0, TN2 and TN4 in every sector for an effective 3/9 reuse pattern. Packet data traffic is removed from blocks carrying PBCCH and PCCCH on time slots TN0, TN2, TN4, and TN6 for an effective 4/12 reuse pattern. This is illustrated in FIGS. 14A, 14B, and 15, which show multiframes 120C and 120D for 4/12 and 3/9 channel reuse patterns, respectively, for use in large cells. As a result, blocks carrying PBCCH and PCCCH do not carry packet data traffic for large cells in the 4/12 multiframe structure 120C. In the effective 3/9 multiframe structure 120D of FIG. 16, time slots TN6 and TN7 in the blocks carrying PBCCH and PCCCH are allowed to carry packet data traffic, but blocks in time slots not carrying PBCCH or PCCCH are idle. This effectively provides an increased guard period of 8.25+156.25 bits for PBCCH and PCCCH in both the effective 3/9 and 4/12 channel reuse patterns since packet data traffic is not communicated before communication of PBCCH and PCCCH. A guard period greater than a time slot period is thus provided to protect PBCCH and PCCCH.

In effect, control signaling is communicated in predetermine time slots of predetermined frames in a multiframe. Idle periods are communicated in time slots adjacent the predetermined time slots of the predetermined time frames to protect the control signaling from interference by traffic channels.

Other control channels, such as PTCCH, may also be similarly protected. For example, in FIGS. 14A, 14B, and 15, block B2 before frame FRN 12 carrying the first PTCCH may be set idle to protect PTCCH in frame number 12 of time slot TN0. Similar protection may be afforded PTCCH in frame FRN 38 if PCCCH in block 8 is moved elsewhere.

Thus, generally, all control channels can be protected by placing an idle time slot adjacent a time slot carrying a control channel. The higher effective reuse patterns used in embodiments of the invention, as well as the scheme to protect such higher effective reuse patterns in relatively large cells, may be implemented for other types of wireless systems (either circuit-switched or packet-switched, or both) in further embodiments.

By using the channel reuse pattern in accordance with some embodiments in which channel reuse is based both on frequency and time, it is possible to reduce the spectrum that is allocated to carriers for the packet data link. In the described embodiment, the allocated spectrum can be maintained below about 1 MHz by using three 200-kHz carriers (600 kHz) and a guard band. Further, by allocating control signaling in time slots so that increased guard periods are provided between packet data traffic and the control signaling, protection is provided the control signaling in large cells to maintain the higher effective reuse pattern. Although the basic channel reuse pattern is 1/3 for packet data traffic in the described embodiment, higher effective reuse patterns (3/9, 4/12, or other) are provided for the control channels to reduce the likelihood that interference will cause failures of wireless communication. Consequently, a wireless packet data link that complements (or overlays) an existing wireless primary traffic link may be allocated a reduced frequency spectrum while using an aggressive channel reuse pattern for data (or bearer) traffic. By limiting the frequency spectrum that needs to be allocated for the packet data link, displacement of existing primary traffic can be avoided. Such displacement may occur if a conventional frequency reuse plan of 3/9, 4/12, or 7/21 is used.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use in a mobile communications system having a plurality of cell segments, comprising:
    communicating control and traffic signaling in a frame having a plurality of time slots in each cell segment, the time slots being time synchronized among the cell segments; and
    transmitting control signaling in time slots adjacent time slots allocated as guard periods to protect the control signaling in a time slot of a first cell segment from interference by traffic signaling in another time slot of a neighboring cell segment,
    wherein transmitting the control signaling includes transmitting the control signaling in every other time slot of frames.

2. A method for use in a mobile communications system having a plurality of cell segments, comprising:

communicating control and traffic signaling in a frame having a plurality of time slots in each cell segment, the time slots being time synchronized among the cell segments; and transmitting control signaling in time slots adjacent time slots allocated as guard periods to protect the control signaling in a time slot of a first cell segment from interference by traffic signaling in another time slot of a neighboring cell segment, wherein communicating the control and traffic signaling includes communicating the control signaling in odd time slots of frames.

3. A method for use in a mobile communications system having a plurality of cell segments, comprising:

communicating control and traffic signaling in a frame having a plurality of time slots in each cell segment, the time slots being time synchronized among the cell segments; and transmitting control signaling in time slots adjacent time slots allocated as guard periods to protect the control signaling in a time slot of a first cell segment from interference by traffic signaling in another time slot of a neighboring cell segment, wherein time frames includes time slots 0, 1, 2, 3, 4, 5, 6, and 7, and wherein the transmitting includes transmitting the control signaling in time slots 1, 3, and 5.

4. A method for use in a mobile communications system having a plurality of cell segments, comprising:

communicating control and traffic signaling in a frame having a plurality of time slots in each cell segment, the time slots being time synchronized among the cell segments; and transmitting control signaling in time slots adjacent time slots allocated as guard periods to protect the control signaling in a time slot of a first cell segment from interference by traffic signaling in another time slot of a neighboring cell segment, wherein time frames includes time slots 0, 1, 2, 3, 4, 5, 6, and 7, and wherein the transmitting includes transmitting the control signaling in time slots 1, 3, 5, and 7.

5. A method for use in a mobile communications system having a plurality of cell segments, comprising:

communicating control and traffic signaling in a frame having a plurality of time slots in each cell segment, the time slots being time synchronized among the cell segments; and transmitting control signaling in time slots adjacent time slots allocated as guard periods to protect the control signaling in a time slot of a first cell segment from interference by traffic signaling in another time slot of a neighboring cell segment, wherein transmitting the control signaling includes transmitting one of a synchronization burst and a frequency correction burst.

6. A method for use in a mobile communications system having a plurality of cell segments, comprising:

defining a plurality of channels and a frame having a plurality of time slots;

providing a channel reuse pattern that is based on a plurality of channel frequencies and a plurality of time groups, wherein signaling is transmitted in different time slots of the frame in corresponding time groups;

providing predetermined time slots as guard periods to reduce likelihood of interference of signaling due to overlap of time slots in neighboring cell segments, wherein the defining includes defining a frame having eight time slots; and allocating control signaling to be carried in odd time slots of frames.

7. The method of claim 6, wherein providing time slots as guard periods includes the time slots to be idle.

8. A method for use in a mobile communications system, comprising:

carrying control signaling in a multiframe that includes a plurality of frames, each frame including a plurality of time slots;

communicating control signaling in predetermined time slots of predetermined frames; and communicating idle periods in time slots allocated as guard periods adjacent the predetermined time slots of the predetermined frames, wherein each frame includes eight time slots, and wherein communicating the control signaling includes communicating the control signaling in odd time slots of the predetermined frames.

9. The method of claim 8, wherein communicating the idle periods includes communicating the idle periods in even time slots of the predetermined frames.

10. The method of claim 9, wherein each frame includes time slots 0, 1, 2, 3, 4, 5, 6, and 7, and wherein communicating the control signaling includes communicating the control signaling in time slots 1, 3, and 5, and communicating the idle periods includes communicating the idle periods in time slots 0, 2, and 4.

11. The method of claim 9, wherein each frame includes time slots 0, 1, 2, 3, 4, 5, 6, and 7, and wherein communicating the control signaling includes communicating the control signaling in time slots 1, 3, 5, and 7, and wherein communicating the idle periods includes communicating the idle periods in time slots 0, 2, 4, and 6.

12. The method of claim 8, further comprising communicating traffic in at least some of the frames other than the predetermined frames.

* * * * *